United States Patent [19]

Irie et al.

[11] Patent Number: 5,126,787
[45] Date of Patent: Jun. 30, 1992

[54] AUTOMATIC DOCUMENT CONVEYING DEVICE

[75] Inventors: Yoichiro Irie, Suita; Yoshiyuki Takeda; Tsuyoshi Nagao, both of Osaka; Yasuhiko Kida, Hirakata, all of Japan

[73] Assignee: Mita Industrial Co., Ltd., Osaka, Japan

[21] Appl. No.: 722,166

[22] Filed: Jun. 27, 1991

Related U.S. Application Data

[62] Division of Ser. No. 614,199, Nov. 16, 1990, Pat. No. 5,044,052.

[30] Foreign Application Priority Data

Nov. 28, 1989 [JP] Japan .................. 64-306686

[51] Int. Cl.⁵ ............................. G03B 27/62
[52] U.S. Cl. ...................... 355/75; 355/308; 355/320; 271/3; 271/10; 271/224; 271/291
[58] Field of Search ............ 271/3, 4, 6, 10, 207, 271/223, 224, 291; 355/75, 320, 308

[56] References Cited

U.S. PATENT DOCUMENTS

| 4,190,359 | 2/1980 | Murayama et al. | 355/75 |
| 4,365,893 | 12/1982 | Kimura et al. | 355/75 |
| 4,530,598 | 7/1985 | Kajita et al. | 355/75 |
| 5,003,347 | 3/1991 | Kameda | 355/75 |

*Primary Examiner*—Monroe H. Hayes
*Attorney, Agent, or Firm*—Antonelli, Terry, Stout & Kraus

[57] ABSTRACT

An automatic document conveying device for an image processor having a transparent plate disposed on the upper surface of a housing for placement of a document to be processed thereon. The automatic document conveying device comprises a document introduction portion, a main portion and a document delivery portion. The document introduction portion includes an introduction portion frame member, a document table extending upstreams from the introduction portion frame member, a document introduction passage extending from the document table to the transparent plate inside the introduction frame member, a document sender for sending the document into the document introduction passage from the document table, and a document introductor for introducing the document onto the transparent plate from passage. The main portion includes a movable main portion frame member mounted to move between a closed position covering the transparent plate and an open position exposing the transparent plate to view, and the document conveyor that conveys the document along the transparent plate when the movable main portion frame member is in the closed position. The document conveyor includes a conveyor belt mechanismm on the movable main portion frame member. The document delivery portion includes a delivery portion frame member, a document delivery passage within the delivery portion frame member, and a document deliverer that delivers the document onto the document receiving tray through the document delivery passage. The document delivery portion includes a document re-introduction passage extending to the transparent plate, being branched from the document delivery passage.

25 Claims, 12 Drawing Sheets

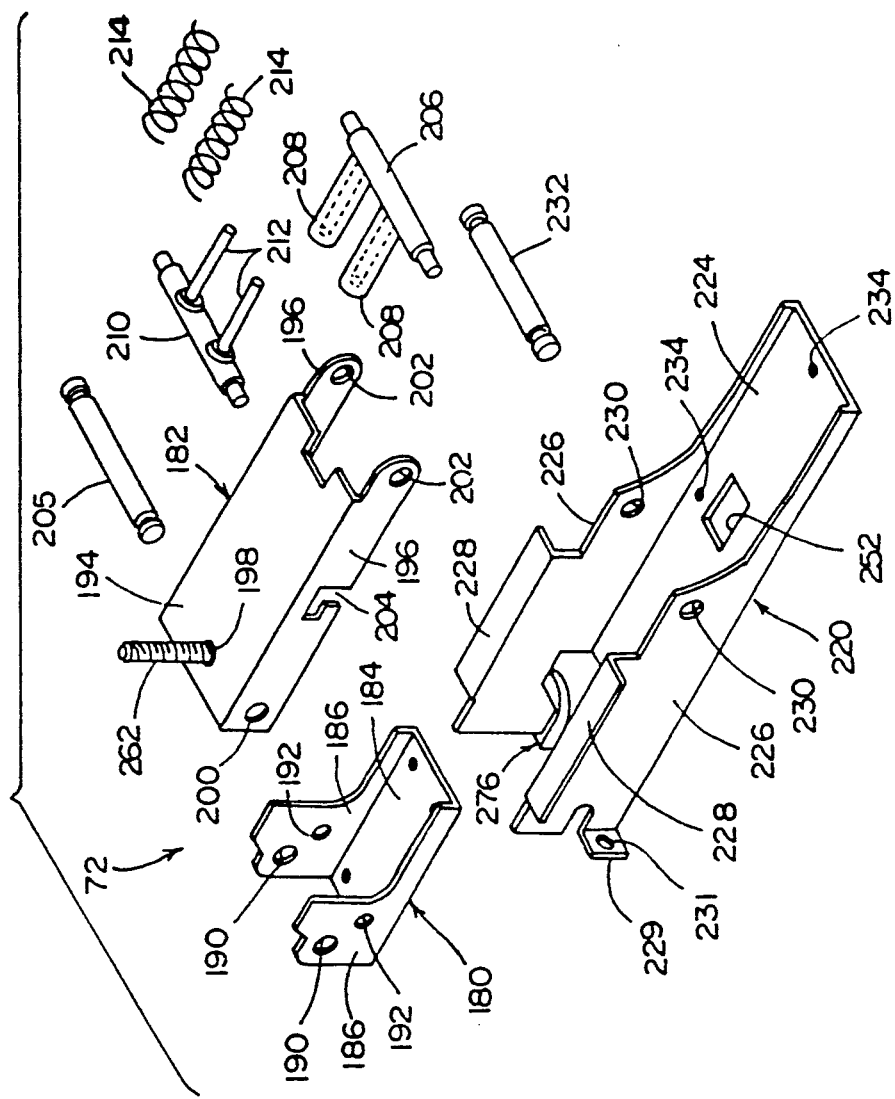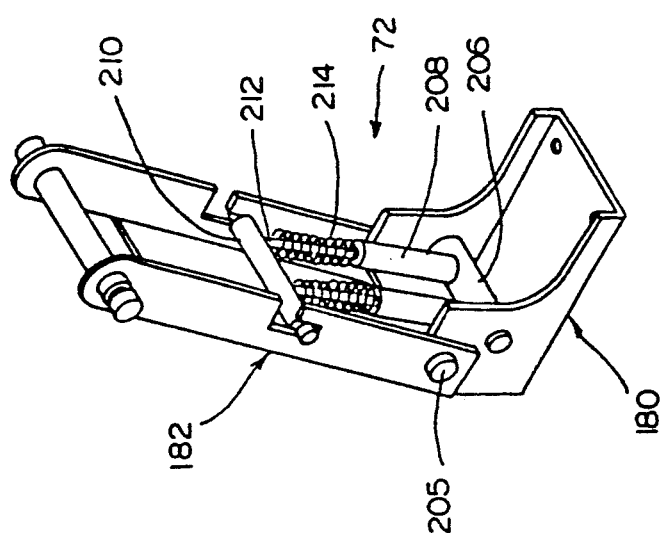

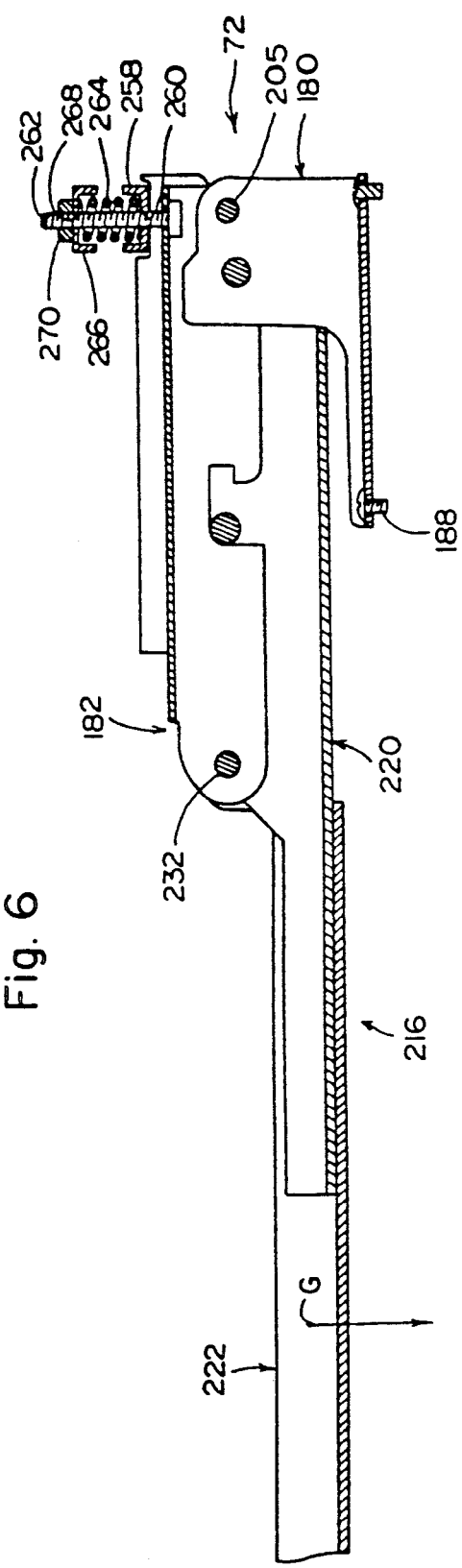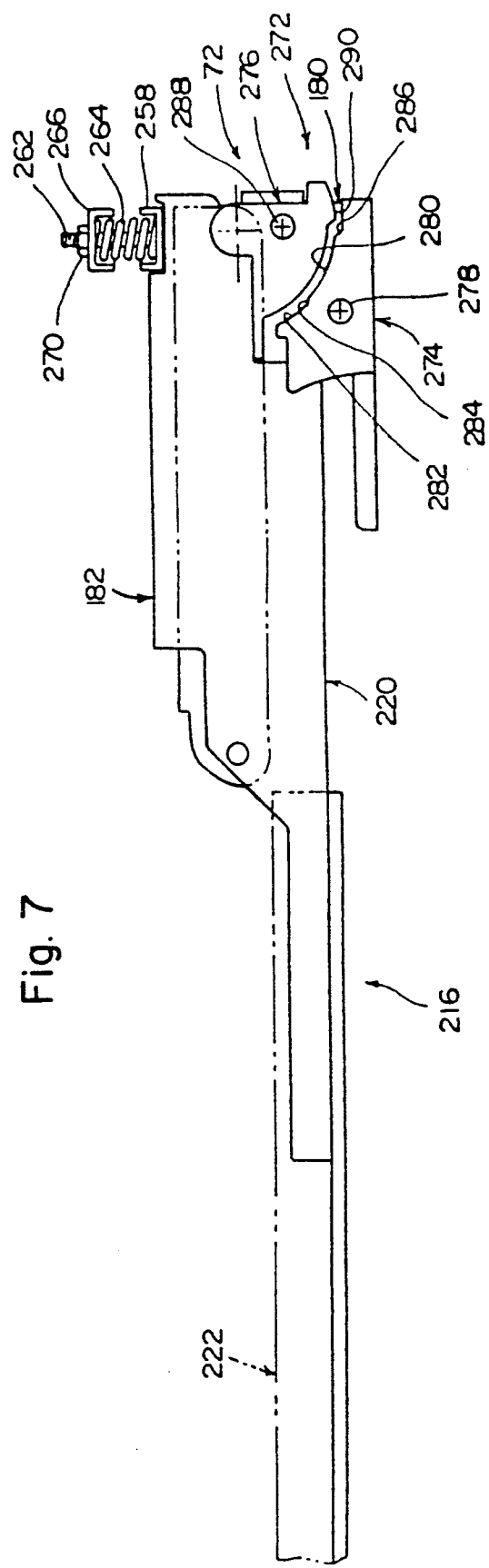

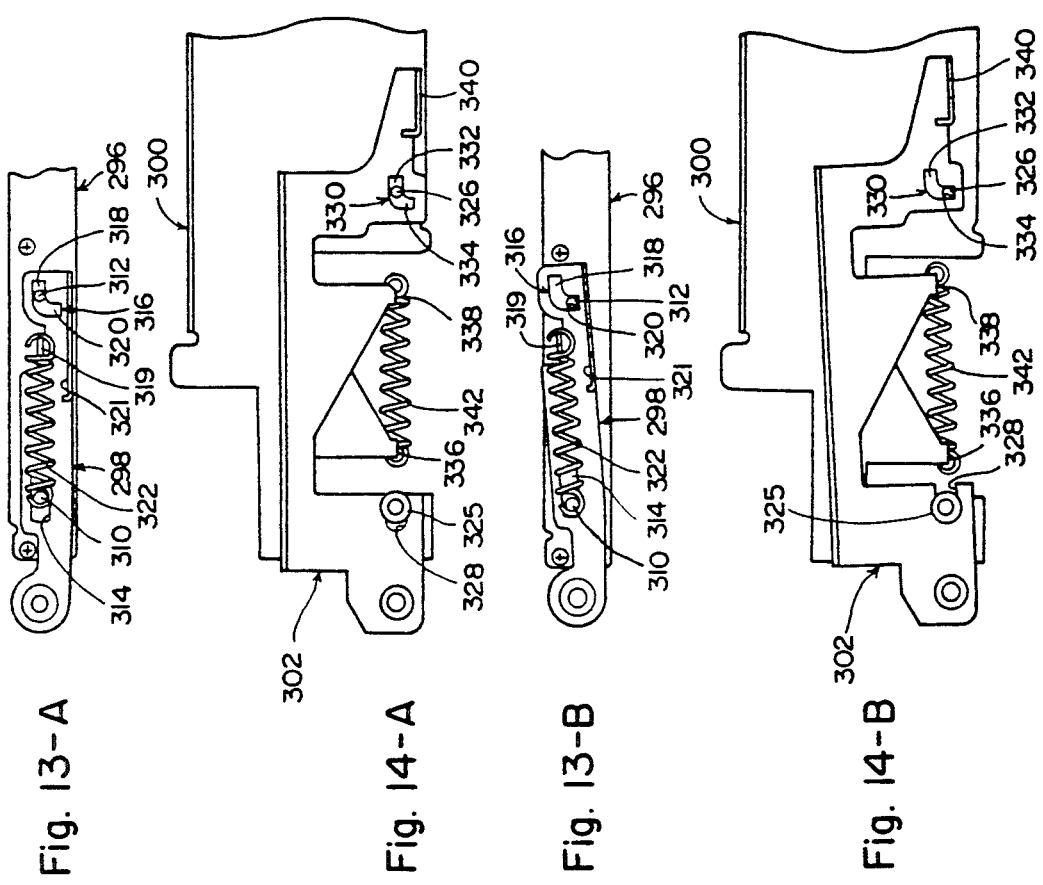

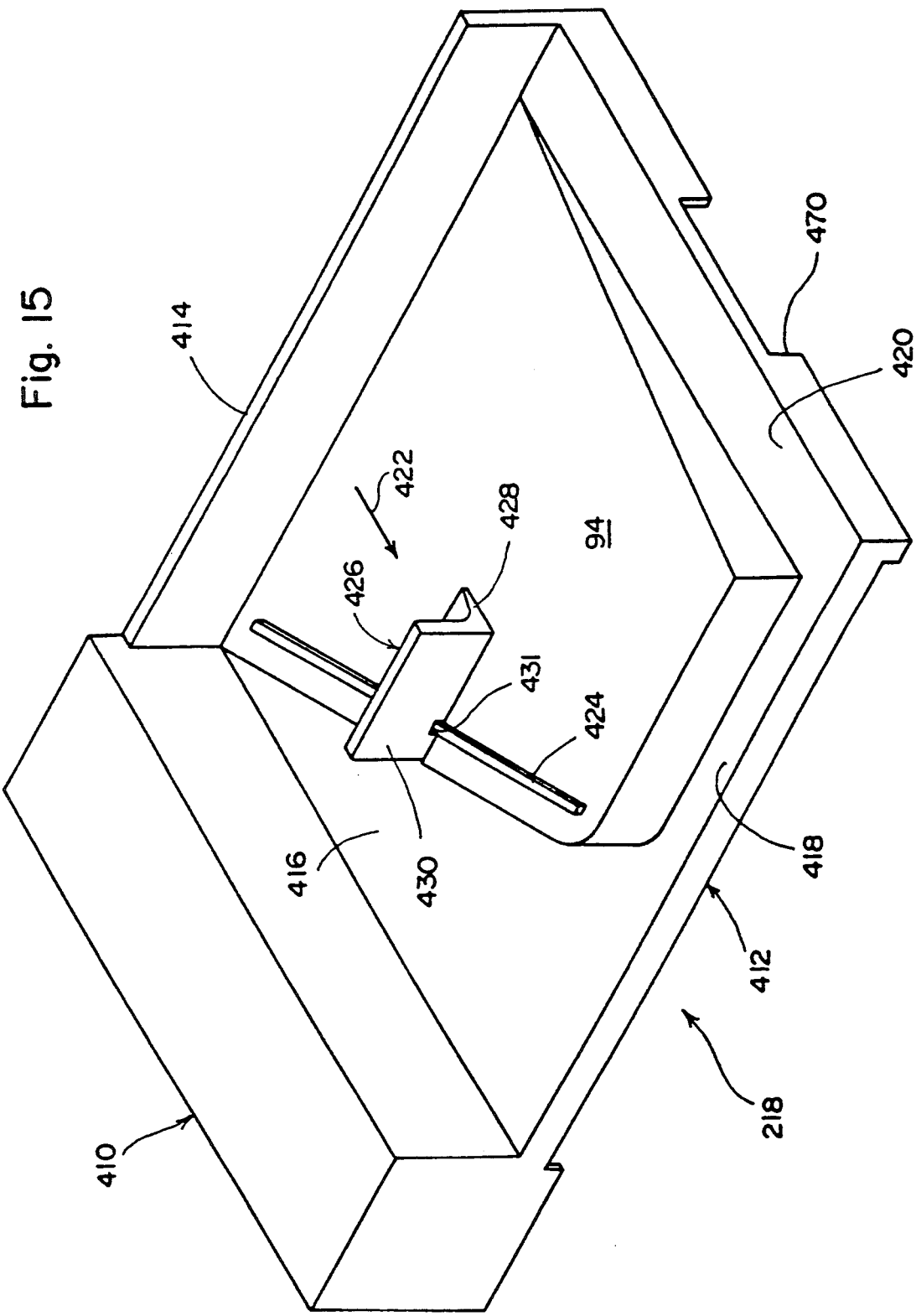

AUTOMATIC DOCUMENT CONVEYING DEVICE

This is a division of U.S. patent application Ser. No. 07/614,199 filed Nov. 16, 1990 5044052.

FIELD OF THE INVENTION

The present invention relates, to an automatic document conveying device for an image processor such as an electrostatic copying machine or an image reader.

DESCRIPTION OF THE PRIOR ART

It is a widely accepted practice to provide image processing machines, such as electrostatic copying machines and image readers, with an automatic document conveying device in order to automatically handle the documents in the image copying operation or in the image reading operation. Prior literature disclosing automatic document conveying devices can be represented by Japanese Patent Laid-Open Publication Nos. 91747/1978 and 118551/1985, and Japanese Utility Model Laid-Open Publication No. 49348/1986.

An image processing machine such as an electrostatic copying machine or an image reader, has a housing, and on the upper surface of the housing is disposed a transparent plate on which will be placed a document that is to be processed. The automatic document conveying device is usually equipped with a document introduction portion, a main portion and a document delivery portion. The document introduction portion includes an introduction portion frame member disposed on the upstream side of the transparent plate and a document table that extends toward the upstream side from the introduction portion frame member. In the introduction portion frame member is formed a document introduction passage that extends from the document table toward the transparent plate. A plurality of documents placed on the document table are sent into the document introduction passage piece by piece by the operation of document sending means and are carried onto the transparent plate through the document introduction passage by the operation of document introduction means. The main portion of the automatic document conveying device includes a movable main portion frame member that is mounted to pivot between a closed position in which the transparent plate is covered and an open position in which the transparent plate is exposed to view, and document conveying means which conveys the document along the transparent plate when the movable main portion frame member is at the closed position. The document conveying means is usually constituted by a conveyer belt mechanism mounted on the movable main portion frame member. The document delivery portion includes a delivery portion frame member disposed on the downstream side of the transparent plate. In the delivery portion frame member there is formed a document delivery passage. Further, a document re-introduction passage is often formed therein branched from the document delivery passage and extending toward the downstream end of the transparent plate. The document on the transparent plate is sent into the document delivery passage, delivered through the document delivery passage by the operation of the document delivery means, and discharged onto a document receiving tray, or it is introduced into the document re-introduction passage from the document delivery passage and is re-introduced onto the transparent plate. The document receiving tray is disposed on the main portion or on the delivery portion.

The conventional automatic document conveying devices have the following problems that must be solved.

First, in order for the document delivery means mounted on the movable main portion frame member to deliver the document as desired along the transparent plate when the movable main portion frame member in the main portion of the document conveying device is in the closed position, it is important that the document delivery means be always positioned to maintain a required relationship and sufficient precision with respect to the transparent plate when the movable main portion frame member is in the closed position. In the conventional automatic document conveying devices, however, such a requirement is not satisfied fully stably. When the opening and closing operations of the movable main portion frame member are repetitively carried out, therefore, the document delivery means is not often positioned to maintain the required relationship and sufficiently high precision with respect to the transparent plate. In a conventional typical automatic document conveying device, for instance, the document introduction means that introduces the document onto the transparent plate through the document introduction passage is constituted by an upper roller and a lower roller that cooperate together. The upper roller is mounted on the movable main portion frame member of the main portion, and the lower roller is mounted on the introduction frame member of the document introduction portion. In such a case, the mutually pressing relationship between the upper roller and the lower roller becomes nonuniform in the axial direction of the rollers due to the opening and closing motions of the movable main portion frame member, and the document delivery means is often not positioned to maintain the predetermined relationship with respect to the transparent plate.

Second, the document conveying means in the main portion of the automatic document conveying device is constituted by a conveyer belt mechanism that includes a driven roller and a follower roller disposed in the document conveying direction at a preset distance, and an endless belt wound around these rollers. With such a conveyer belt mechanism, the endless belt must be replaced when it is fouled or is damaged. In the conventional automatic document conveying device, however, the operation for replacing the endless belt (operation for removing and mounting the belt) of the coneyer belt mechanism is not easy but is relatively complex.

Third, when the automatic document conveying device is used, it is important that the movable main portion frame member that is pivotable in the main portion be reliably held at the closed position. Therefore, the movable main portion frame member is equipped with a grip member, which will be gripped by the fingers of a hand of the operator when it is to be opened or closed, and with a permanent magnet. When the movable main portion frame member is brought to the closed position, the permanent magnet is magnetically attracted by the magnetic member in the housing of the image processor, so that the movable main portion frame member is held at the closed position. Further, when the movable main portion frame member is to be pivoted from the closed position to the open position, the movable main portion frame member must be moved relatively easily from the closed position overcoming the magnetic attracting force of the permanent magnet. For this purpose, therefore, when the grip member is slightly moved by the fingers of hand, the permanent magnet is slightly tilted before the movable main portion frame member is moved such that the magnetic attracting force of the permanent magnet decreases. The conventional automatic document conveying devices are employing a relatively complex and expensive mounting mechanism (mounting mechanism having a short pivot shaft that is pivotably mounted) that enables the permanent magnet to be tilted.

Fourth, the main portion of the automatic document conveying device includes the movable main portion frame member and the document conveying means. The movable main portion frame member is constituted by a support base member and a cover member. The document conveying means is mounted on the support base member, and the document conveying means is covered by a cover member. To facilitate the operation of opening and closing the movable main portion frame member, it is desirable to minimize the weight thereof. However, the conventional automatic document conveying devices do not fully satisfy such a requirement.

Fifth, the movable main portion frame member in the main portion of the automatic document conveying device is usually mounted on the housing of the image processor via a hinge mechanism which includes a stationary member mounted on the upper surface of the housing and a pivoting member pivotably coupled to the stationary member. The movable main portion frame member is pivotably coupled to the pivoting member of the hinge mechanism so as to be stably positioned to maintain a required relationship relative to the transparent plate. It is desired that the pivoting member of the hinge mechanism be relatively short from the standpoint of decreasing the weight and reducing the cost. In this case, however, the position where the pivoting member and the movable main portion frame member are coupled together is located considerably to the rear (i.e., on the side of the stationary member of the hinge mechanism) of the center of gravity of the movable main portion frame member and the constitutional element (e.g., conveyer belt mechanism) mounted thereon. When the movable main portion frame member is at the closed position, therefore, a force is exerted on the movable main portion frame member so as to pivot it in a particular direction relative to the pivoting member of the hinge mechanism due to the weight of the movable main portion frame member and of the constitutional element mounted thereon. Such a force changes the required positioning of the movable main portion frame member and the constitutional elements mounted thereon with respect to the transparent plate. In order to solve such a problem, it can be contrived to sufficiently extend the pivoting member of the hinge mechanism forward in order to bring the coupling position of the pivoting member and the movable main portion frame member into agreement with the center of gravitry of the movable main portion frame member and of the constitutional elements mounted thereon. For this purpose, however, the pivoting member of the hinge mechanism must be lengthened to a considerable degree, resulting in an increase in the weight and in the manufacturing cost to a considerable degree.

Sixth, the movable main portion frame member in the main portion of the automatic document conveying device is constituted by a support base member and a cover member, and the document conveying means is constituted by the conveyer belt mechanism mounted on the support base member. The conveyer belt mechanism is constituted by a driven roller and a follower roller disposed in a document delivery direction at a preset distance, an endless belt wound around the driven roller and the follower roller, and a plurality of pressing rollers that are disposed between the driven roller and the follower roller and that press the lower running portion of the endless belt onto the transparent plate. The support base member of the movable main portion frame member extends between the lower running portion and the upper running portion of the endless belt. In such a conventional automatic document conveying device, there arises no problem when the endless conveyer belt mechanism is driven in a predetermined direction, i.e., in a direction in which the upper running portion of the endless belt is stretched. When the conveyer belt mechanism is driven in the reverse direction, i.e., in a direction in which the upper running portion of the endless belt is slackened, the upper running portion of the endless belt that is slackened comes in contact with the support base member that is extending under the endless belt and produces large noise and is further damaged within a short period of time due to the friction.

Seventh, the document receiving tray that receives the documents discharged from the transparent plate is usually provided with a document stop piece that is mounted to move in the document conveying direction and that is positioned at a position that depends upon the size in the conveying direction of the document discharged onto the document receiving tray. The leading edge of the document discharged onto the document receiving tray comes in contact with the document stop piece, and the document is stopped on the document receiving tray. The width of the document stop piece is usually considerably smaller than the width of the document that comes into contact therewith. In a so-called one-edge reference type automatic document conveying device, on the other hand, the document is conveyed on the transparent plate and is discharged onto the document receiving tray with its one edge located at a predetermined position irrespective of its size in the direction of width thereof. In this case, the document stop piece moves in the conveying direction only while the document is discharged with its one edge located at the predetermined position irrespective of its size in the direction of width. Therefore, the document that has a considerably large size or a considerably small size in the direction of width comes in contact with the document stop piece not at its central portion in the direction of width but at its one side portion only, whereby the document tends to be turned from the condition in which it is nearly at right angles with the conveying direction.

SUMMARY OF THE INVENTION

The first object of the present invention is to provide an improved automatic document conveying device in which the movable main portion frame member and the document conveying means mounted thereon are stably positioned to maintain a required relationship and sufficiently high precision with respect to the transparent plate even after opening and closing of the movable main portion frame member in the main portion of the document conveying device are carried out repetitively.

The second object of the present invention is to provide an improved automatic document conveying device which greatly facilitates renewing of the endless belt of the conveyer belt mechanism that constitutes the document conveying means in the main portion of the automatic document conveying device.

The third object of the present invention is to provide an improved automatic document conveying device in which a grip member and a permanent magnet are tiltably mounted on the movable main portion frame member in the main portion of the automatic document conveying device in a very simple and inexpensive way.

The fourth object of the present invention is to provide an improved automatic document conveying device which enables the weight of the movable main portion frame member, and particularly the weight of the support base member, to be minimized in the main portion of the automatic document conveying device.

The fifth object of the present invention is to provide an improved automatic document conveying device in which although the movable main portion frame member in the main portion of the automatic document conveying device is coupled to a pivoting member of a hinge mechanism at a position considerably to the rear of the center of gravity of the main portion, and hence the pivoting member of the hinge mechanism is not unnecessarily extended, the positioning of the movable main portion frame member and of the document conveying means relative to the transparent plate is not affected by the weight of the main portion.

The sixth object of the present invention is to provide an improved automatic document conveying device in which the upper running portion of the endless belt is sufficiently reliably prevented from coming into contact with a stationary member such as the support base member that extends under the endless belt even when the conveyer belt mechanism is rotatably driven in a direction in which the upper running portion of the endless belt is slackened in the conveyer belt mechanism that constitutes the document conveying means in the main portion of the automatic document conveying device.

The seventh object of the present invention is to provide an improved automatic document conveying device having a document conveying system of a so-called one-edge reference type, in which a central portion in the direction of width of the leading edge of the discharged document comes in contact with a document stop piece disposed on the document receiving tray, and the discharged document is reliably prevented from turning irrespective of the conveying direction of the document that is discharged onto the document receiving tray and irrespective of the size of the document in the direction of width.

Other technical aspects of the present invention will become obvious from the following detailed description of the preferred embodiments of the automatic document conveying device constituted according to the present invention, with reference to the accompanying drawings.

In order to achieve the above-mentioned first object according to the present invention, the drive-related mechanism in the document introduction portion (and in the document delivery portion) is cmpietely separated from the drive-related mechanism of the main portion that includes the movable main portion frame member and the document conveying means mounted thereon, so that the drive force and the pressing force will not interact between the document introduction portion (and/or document delivery portion) and the main portion.

In order to achieve the above-mentioned second object according to the present invention, at least the front-side support means, or, preferably both the front-side support means and rear side support means, constituting the means for supporting tho conveyer belt mechanism are constituted by a driven-side support member and a follower-side drive member that are combined together so as to move relatively in the conveying direction, resiliently urging means which resiliently urges the driven-side support member and the follower-side support member in a direction to extend the overall length thereof, and locking means that releasably locks the driven-side support member and the follower-side support member under the condition in which they are relatively moved by a predetermined amount in a direction in which the overall length thereof is shortened overcoming the resiliently urging action of the resiliently urging means.

In order to achieve the above-mentioned third object according to the present invention, a grip member and a permanent magnet are mounted via a leaf spring on the movable main portion frame member in the main portion of the automatic document conveying device.

In order to achieve the above-mentioned fourth object according to the present invention, the support base member of the movable main portion frame member in the main portion of the automatic document conveying device is constituted by a support member that is cantilevered and that extends from the trailing end, the support member being so formed that a front portion has a geometrical moment of inertia smaller than that of a rear portion thereof in order to reduce the weight.

In order to achieve the above-mentioned fifth object according to the present invention, resiliently urging means is interposed between the movable main portion frame member in the main portion of the automatic document conveying device and the pivoting member of the hinge mechanism, in order to impart a balancing moment of rotation of a required amount to the movable main portion frame member from the resiliently urging means.

In order to achieve the above-mentioned sixth object according to the present invention, at least one pressing roller among from among a plurality of pressing rollers disposed between the driven roller and the follower roller in the conveyer belt mechanism, has a diameter which is greater than the diameters of the driven roller and the follower roller by more than a predetermined amount.

In order to achieve the above-mentioned seventh object according to the present invention, the document stop piece disposed on the document receiving tray is allowed to move in a predetermined tilted direction from the side of a predetermined reference position in the direction of width to the central side in the direction of width toward the downstream side in which the document is delivered.

BRIEF DESCRIPTION OF THE DRAWINGS

FIG. 4 is a perspective view illustrating a hinge mechanism in the automatic document conveying device of FIG. 1;

FIG. 5 is a perspective view illustrating, in a disassembled manner, the hinge mechanism in the automatic document conveying device of FIG. 1 and a coupling member of a support base member of the central main portion mounted thereon;

FIG. 6 is a sectional view illustrating the hinge mechanism in the automatic document conveying device of FIG. 1 and the support base member of the central main portion mounted thereon;

FIG. 7 is a side view illustrating the hinge mechanism in the automatic document conveying device of FIG. 1 and the support base member of the central main portion mounted thereon;

FIG. 13-A and FIG. 13-B are partial side views showing the front-side support means of the document conveying means (conveyer belt mechanism) in the automatic document conveying device of FIG. 1 under the condition where the overall length thereof is extended (belt is stretched) and under the condition where the overall length thereof is contracted (belt is slackened);

FIG. 14-A and FIG. 14-B are partial side views showing the rear-side support means of the document conveying means (conveyer belt mechanism) in the automatic document conveying device of FIG. 1 under the condition where the overall length thereof is extended (belt is stretched) and under the condition where the overall length thereof is contracted (belt is slackened); and FIG. 15 is a perspective view showing a cover member of the central main portion in the automatic document conveying device of FIG. 1.

DETAILED DESCRIPTION OF THE PREFERRED EMBODIMENTS

The automatic document conveying device constituted according to the present invention and mounted on an electrostatic copying machine will now be described in detail with reference to the accompanying drawings.

Overall Constitution

Figure 1:
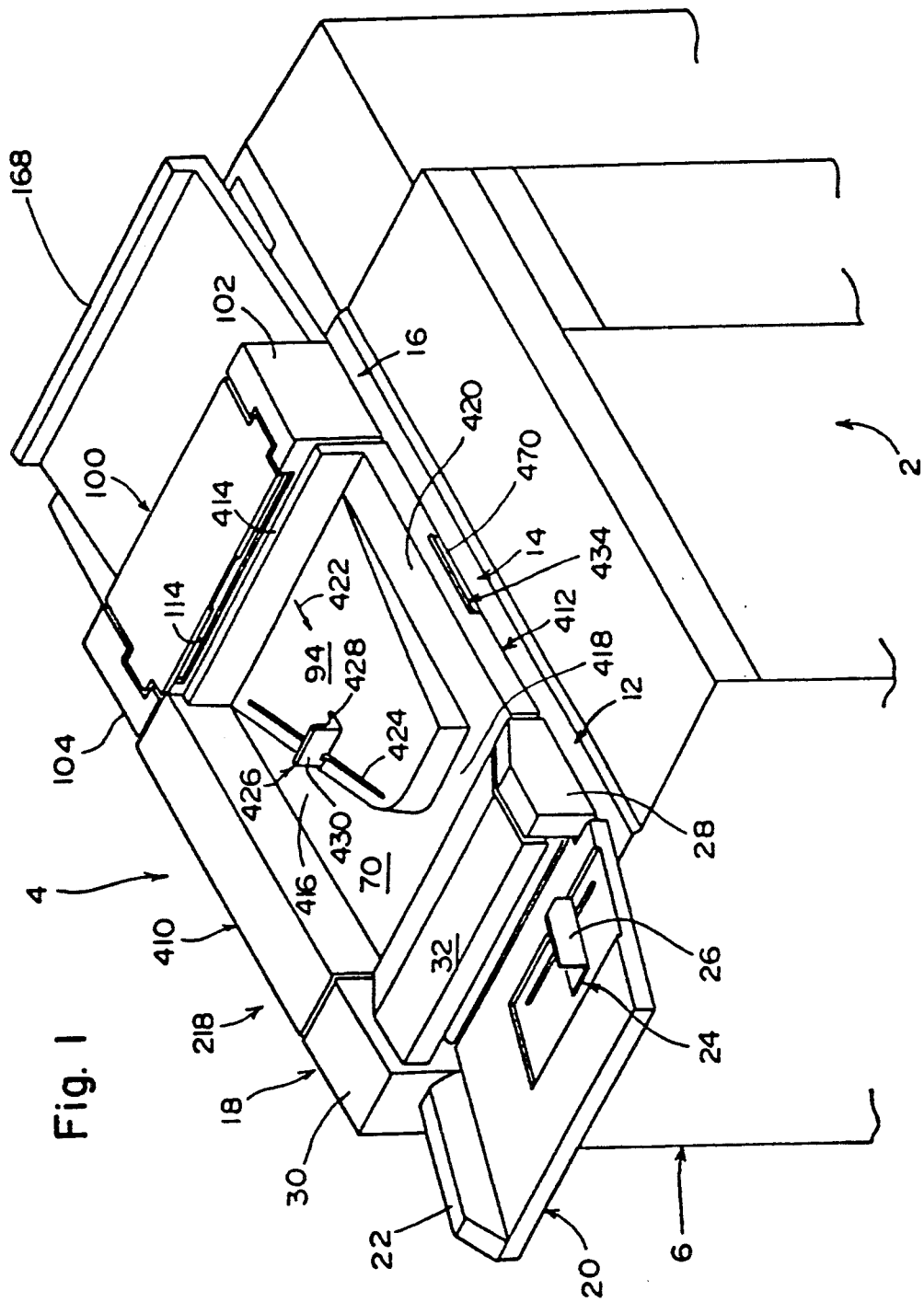
FIG. 1 is a perspective view which illustrates an automatic document conveying device constituted according to the present invention and mounted on an electrostatic copying machine under the condition where the central main portion thereof is at the closed position.
Figure 2:
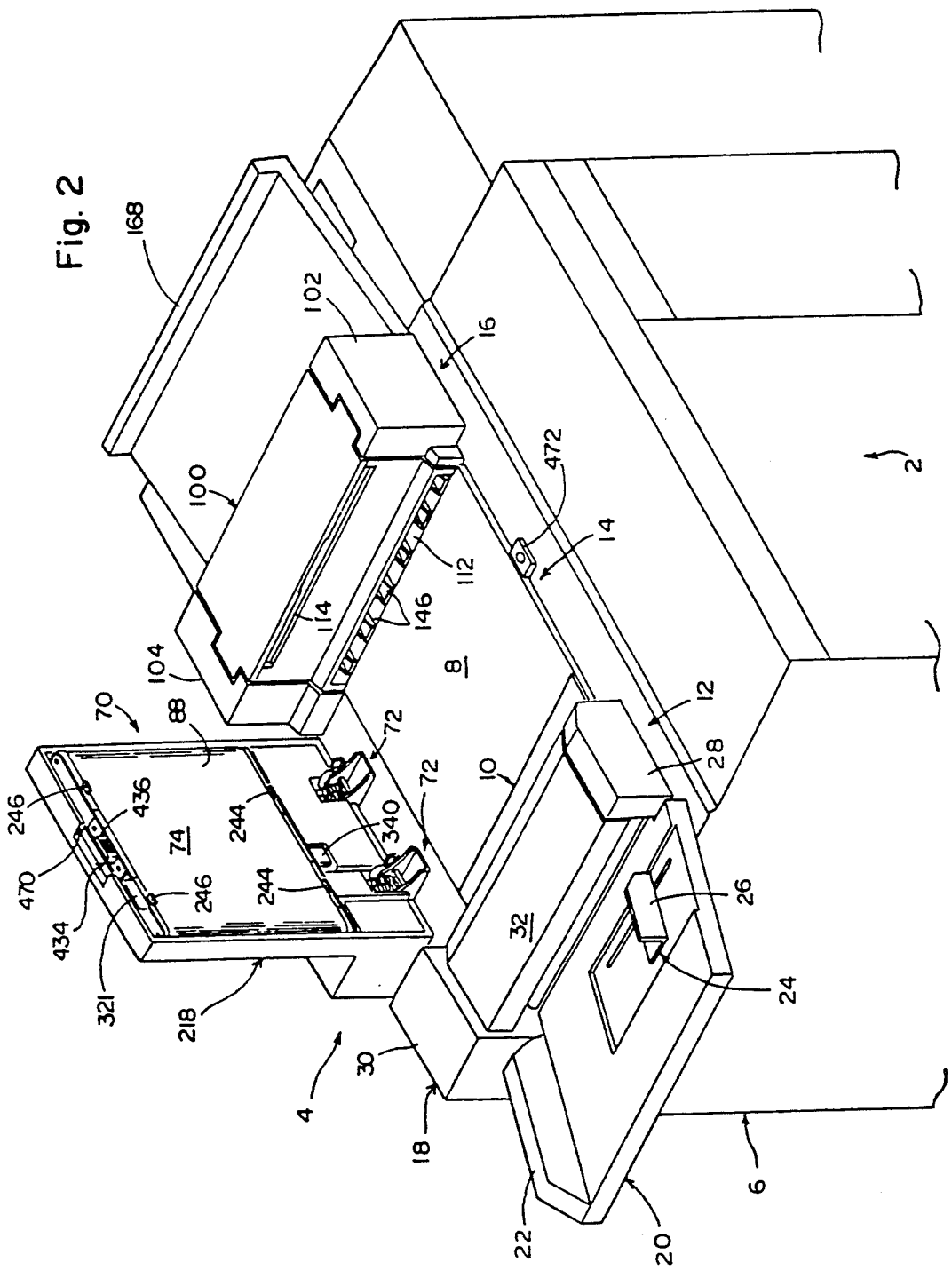
FIG. 2 is a perspective view which illustrates the automatic document conveying device of FIG. 1 under the condition where the central main portion thereof is at the open position.
Figure 3:
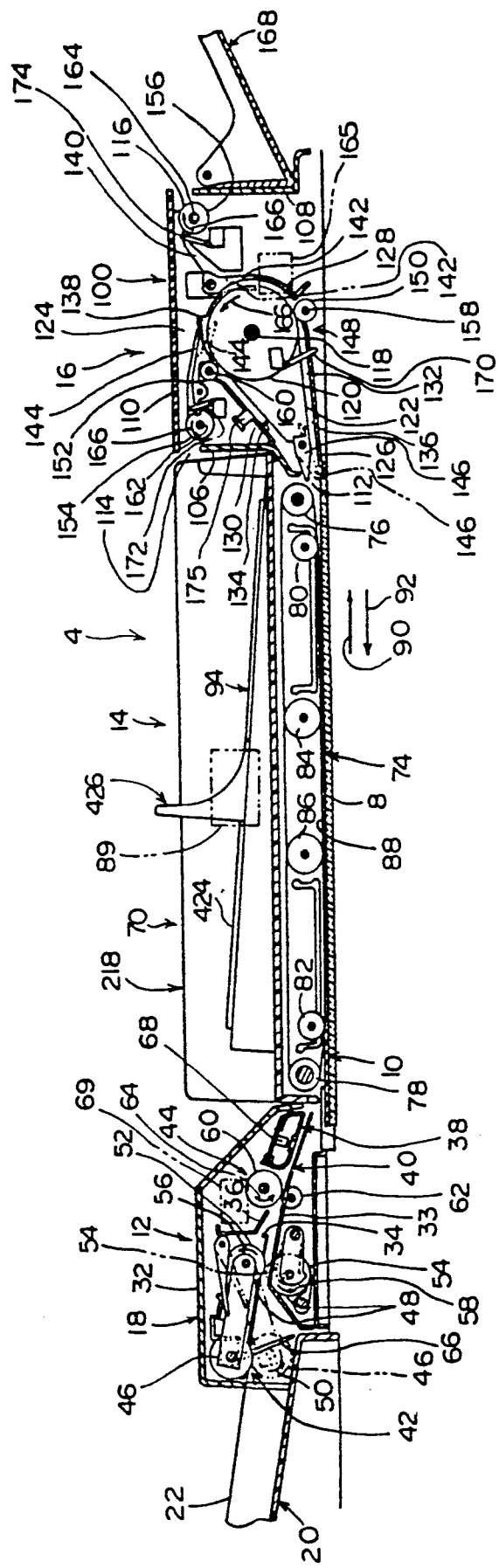
FIG. 3 is a sectional view illustrating the automatic document conveying device of FIG. 1 under the condition where the central main portion thereof is at the closed position.

FIGS. 1, 2 and 3 illustrate an electrostatic copying machine 2 and an automatic document conveying device generally designated at 4 that is mounted on the electrostatic copying machine 2. The electrostatic copying machine 2 which per se may be of a known form is equipped with a nearly parallelopiped housing 6. A transparent plate 8 (FIGS. 2 and 3) made of a glass, which may be of a rectangular shape, is disposed at a central portion on the upper surface of the housing 6. A document placing-position restricting member 10 is disposed at one end edge of the transparent plate 8 (left end edge in FIG. 3). The document placing-position restricting member 10 extends in a direction perpendicular to the surface of the paper in FIG. 3 along one end edge of the transparent plate 8. Though not diagramed, in the housing 6 of the electrostatic copying machine 2 are disposed various constitutional elements including a rotary drum that has an electrostatic photosensitive member on the surface thereof. As is well known, the document to be copied is placed on the transparent plate 8 with its surface to be copied being faced downwards and its one end edge contacting an inside edge of the document placing-position restricting member 10 (right end edge in FIG. 3). A latent electrostatic image is formed on the rotary drum by the step of forming a latent electrostatic image in which the lower surface of the document placed on the transparent plate 8 is optically scanned and is projected onto the rotary drum, and the latent electrostatic image is developed to a toner image which is then transferred onto a copying sheet, which may be a common paper. The thus transferred toner image is fixed onto the copying sheet. Thus, an image-copied sheet is obtained.

The diagramed automatic document conveying device 4 constituted according to the present invention is made up of a document introduction portion 12, a central main portion 14, and a document delivery and reintroduction portion 16.

The document introduction portion 12 of the automatic document conveying device 4 is disposed on the upstream side of the transparent plate 8 (left side in FIG. 3) and abuts on the one end edge thereof. The document introduction portion 12 includes an introduction portion frame member 18 mounted on the upper surface of the housing 6 of the electrostatic copying machine 2, and a document table 20 that extends to the upstream side from the frame member 18. As clearly shown in FIG. 3, the document table 20 is extended toward the upstream side (toward the left in FIG. 3) being slightly inclined upwards. An upstanding stationary document restricting wall 22 is disposed at the rear edge of the document table 20. The document table 20 is equipped with a movable document restricting member 24 that per se may be of a known form and that is allowed to move back and forth. The movable document restricting member 24 has an upstanding wall 26, and the document placed on the document table 20 is positioned between the stationary document restricting wall 22 and the upstanding wall 26 of the movable document restricting member 24. The frame member 18 includes a front supporting member 28, a rear supporting member 30, and a cover member 32 disposed between these supporting members 28 and 30. As clearly shown in FIG. 3, one lower restricting plate 33 and three upper restricting plates 34, 36 and 38 are disposed in a space under the cover member 32 and between the front supporting member 28 and the rear supporting member 30, and a document introduction passage 40 is defined by the lower restricting plate 33 and the upper restricting plates 34, 36 and 38. With reference to FIG. 3, between the front supporting member 28 and the rear supporting member 30 are disposed document sending means 42 that sends a plurality of documents placed on the document table 20, one by one, into the document introduction passage 40, as well as document introduction means 44 that introduces onto the transparent plate 8 the documents sent into the document introduction passage 40. The document sending means 42 includes a document sending roller 46 and a document separation roller pair 48. The document sending roller 46 is selectively lowered as indicated by a two-dot chain line from a non-acting position indicated by a solid line, is brought into contact with the upper surface at the downstream end of the uppermost document among a plurality of documents placed on the document table 20, and is driven in the direction indicated by arrow 50, so that the document placed on the document table 20 is sent into the document introduction passage 40. The document separation roller pair 48 is constituted by a feel roller 52 and a reversing roller 54. The reversing roller 54 is selectively positioned between a non-acting position indicated by a solid line and an acting position indicated by a two-dot chain line. When located at the non-acting position, the reversing roller 54 is under the feed roller 52 being separated away therefrom. When located at the acting position, the reversing roller 54 is brought into contact with the feed roller 52 to act in cooperation therewith. The feed roller 52 is rotated in the direction indicated by arrow 56, and the reversing roller 54 is rotated in the direction indicated by arrow 58. When a plurality of documents are simultaneously sent from the document table 20 by the documents sending roller 46, the document separation roller pair 48 separates the uppermost document from the other documents and introduces it into the document introduction passage 40 while blocking the introduction of other documents. The document introduction means 44 is constituted by an upper roller 60 and a lower roller 62 that act in cooperation. The upper roller 60 and the lower roller 62 are rotated in the direction indicated by arrow 64, and the document introduced into the document introduction passage 40 is delivered onto the transparent plate 8. Between the front supporting member 28 and the rear supporting member 30 are disposed a placed document detector 66 for detecting a document that is placed on the document table 20 and a plurality of introduced document detectors 68 for detecting a document that is introduced onto the transparent plate 8 via the document introduction passage 40. The plurality of introduced document detectors 68 detect the document, i.e., detect the document that is introduced and further detect the size of the introduced document. The rear supporting member 30 of the introduction portion frame member 12 is equipped with an introduction portion drive source 69 (FIG. 3) which may be an electric motor. The document sending means 42 and the document introduction means 44 in the document introduction portion 12 are driven by the introduction portion drive source 69.

Here, constitutions of the document sending means 42 (document sending roller 46 and document separation roller pair 48), document introduction means 44 (upper roller 60 and lower roller 62) and placed document detector 66 do not constitute any novel features of the present invention and may be one of the forms known by people having ordinary skill, e.g., may be those of the form disclosed in the specification and drawings of Japanese Laid-Open Patent Publication No. 100939/1990 filed by the present applicant entitled "Automatic Document Conveying Device and Image Processing Machine Equipped Therewith)". Therefore, the specification of the preset application does not describe their constitutions in detail.

The central main portion 14 in the automatic document conveying device 4 is equipped with a movable main portion frame member 70. The main portion frame member 70 is mounted on the upper surface of the housing 6 of the electrostatic copying machine 2 via a pair of hinge mechanisms 72 (FIG. 2) disposed at the rear side of the transparent plate 8, and can be manually opened or closed between a closed position shown in FIGS. 1 and 3 and an open position shown in FIG. 2. When the main portion frame member 70 is brought to the closed position, the transparent plate 8 is covered with the main portion frame member 70. On the other hand, when the main portion frame member 70 is brought to the open position, the transparent plate 8 is exposed to the view. A portion of the main portion frame member 70 that covers the transparent plate 8 at the closed position assumes a box-like shape with its lower surface open. As clearly shown in FIG. 3, document conveying means 74 that conveys the document onto the transparent plate 8 is disposed in the box-like portion of the main portion frame member 70. The document conveying means 74 is constituted by a conveyer belt mechanism that includes a driven roller 76, a follower roller 78, pushing rollers 80, 82, 84 and 86 disposed set distances apart in the direction in which the document is conveyed (right-and-left direction in FIG. 3), and an endless belt 88 wound around these rollers. The frame member 70 is equipped with a main portion drive source 89 (FIG. 3) which may be a reversible electric motor. The main portion drive source 89 selectively drives the document conveying means 74 either in the normally conveying direction indicated by arrow 90 or in the reversely conveying direction indicated by arrow 92. The upper surface of the box-like portion of the main portion frame member 70 constitutes a first document receiving tray 94 that receives the document discharged through the document delivery and re-introduction portion 16 which will be described late.

Constitution of the central main portion 14 of the automatic document conveying device 4 will be described later in detail.

The document delivery and re-introduction portion 16 in the automatic document conveying device 4 is disposed on the downstream side (right side in FIG. 3) of the transparent plate 8 and abuts on the other end edge (right end edge in FIG. 3) thereof. The document delivery and re-introduction portion 16 includes a box-like delivery portion frame member 100 with its lower surface open. The frame member 100 is constituted by front and rear members 102 and 104 disposed in a spaced-apart relationship in the to-and-fro direction (direction perpendicular to the surface of the paper in FIG. 3), side walls 106 and 108 disposed in a spaced-apart relationship in the right-left direction in FIG. 3, and an upper surface wall 110. At the lower end of the side wall 106 is formed a passage opening 112 (FIGS. 2 and 3) through which the document will pass. Moreover, a first discharge opening 114 (FIGS. 2 and 3) is formed at the upper end of the side wall 106, and a second discharge opening 116 (FIG. 3) is formed at the upper end of the side wall 108. With reference chiefly to FIG. 3, a horizontally extending rotating shaft 118 is rotatably mounted on the central part of the frame member 100, and a plurality of delivery rollers 120 are secured to the rotating shaft 118 in an axially spaced-part relationship. In relation to the delivery rollers 120, there are disposed a central restricting member 122, an outside restricting member 124, and outside restricting plates 126, 128 and 130 in the frame member 100, thereby forming a document delivery passage 132 and a document re-introduction passage 134. The document delivery passage 132, extending from the passage opening 112, includes a common passage 136 as well as a first branched passage 138 and a second branched passage 140. The common passage 136 extends from the passage opening 112, the first branched passage 138 extends from a branch point (downstream end of common passage 136) to the first discharge opening 114, and the second branched passage 140 extends from the above branching point to the second discharge opening 116. The re-introduction passage 134 is branched from the first branched passage 138 and extends to the passage opening 112. Branched passage switching means 142 is disposed at the branching point of the first and second branched passages 138 and 140, i.e., at the downstream end of the common passage 136. The branched passage switching means 142 is selectively positioned at a first branched position indicated by a solid line and at a second branched position indicated by a two-dot chain line. When the branched passage switching means 142 is positioned at the first branched position, the common passage 136 communicates with the first branched passage 138. When the branched passage switching means 142 is positioned at the second branched position, the common passage 136 is communicated with the second branched passage 140. Discharge re-introduction switching means 144 is disposed at the upstream end of the re-introduction passage 134 which is branched from the first branched passage 138. The discharge re-introduction switching means 144 is selectively positioned at the re-introduction position indicated by a solid line and the discharge position indicated by a two-dot chain line. When the discharge re-introduction switching means 144 is positioned at the re-introduction position, the upstream portion of the first branched passage 138 is shut off from its downstream portion; i.e., the upstream portion of the first branched passage 138 communicates with the re-introduction passage 134. When the discharge re-introduction switching means 144 is positioned at the discharge position, the upstream portion of the first branched passage 138 communicates with its downstream portion, and the re-introduction passage 134 is shut off from the first branched passage. In the diagramed embodiment, furthermore, there is disposed a delivery re-introduction switching means 146 in relation to the passage opening 112, i.e. in relation to the upstream end of the common passage 136 and the downstream end of the re-introduction passage 134. The delivery re-introduction switching means 146 is selectively positioned to the delivery position indicated by a solid line and to the re-introduction position indicated by a two-dot chain line. When the document on the transparent plate 8 is to be delivered onto the common passage 136, the delivery re-introduction switching means 146 is positioned at the delivery position. When the document is to be re-introduced onto the transparent plate 8 via the re-introduction passage 134, the delivery re-introduction switching means 146 is positioned at the re-introduction position.

There is disposed a document delivery means 148 to convey the document as required through the document delivery passage 132 (common passage 136, first branched passage 138 and second branched passage 140) and the re-introduction passage 134. The document delivery means 148 includes, in addition to the delivery rollers 120, follower rollers 150 and 152 cooperating together with the delivery rollers 120, and discharge rollers 154 and 156. A plurality of follower rollers 150 are secured to the rotatably mounted and horizontally extending rotating shaft 158 so as to correspond to the plurality of delivery rollers 120. Similarly, a plurality of follower rollers 152 are secured to a rotatably mounted and horizontally extending rotating shaft 160 so as to correspond to the plurality of delivery rollers 120. The discharge rollers 154 disposed in relation to the first branched passage 138 are secured in plural number to a horizontally extending rotating shaft 162 maintaining a spaced-part relationship in the axial direction, and the discharge rollers 156 disposed in relation to the second branched passage 140 are secured in plural number to a horizontally extending rotating shaft 164 maintaining a spaced-apart relationship in the axial direction. The delivery portion frame member 100 is provided with a delivery portion drive source 165 (FIG. 3) which may be an electric motor, and the document delivery means 148 is driven by the delivery portion drive source 165. The delivery rollers 120 and the discharge rollers 154 and 156 are rotated in the directions indicated by their respective arrows 166, and the follower rollers 150 and 152 are moved in the direction indicated by arrow 166. The discharge roller 154 discharges, through the first discharge opening 114, the document that is delivered to the downstream portion of the first branched passage 138. The document discharged through the first discharge opening 114 is accommodated in the first document receiving tray 94 formed on the upper surface of the main portion frame member 70. The discharge roller 156 discharges, through the second discharge opening 116, the document that is delivered onto the second branched passage 140. A second document receiving tray 168 is disposed on the downstream side of the second discharge opening 116, and the document discharged through the second discharge opening 116 is accommodated in the second document receiving tray 168. In the document delivery and re-introduction portion 16 are further disposed delivered document detecting means 170 that detects the document delivered from the transparent plate 8 to the common passage 136 of the document delivery passage 132, first discharged document detecting means 172 that detects the document discharged onto the first document receiving tray 94 via the first branched passage 138, second discharged document detecting means 174 that detects the document discharged onto the second document receiving tray 168 via the second branched passage 140, and re-introduced document detecting means 175 that detects the document re-introduced onto the transparent plate 8 via the re-introduction passage 134. These detecting means 170, 172, 174 and 175 may be constituted by using microswitches or photoelectric switches.

The document delivery and re-introduction portion 16 does not constitute any novel feature of the present invention and may, hence, be those of the forms disclosed in detail in the specification and drawings of U.S. Pat. No. 5,064,188 issued Nov. 12, 1991 and entitled Automatic Document Conveying Device) filed by the present applicant. Therefore, they are not described in detail in the specification of the present application.

The above-mentioned automatic document conveying device 4 conveys the document in any one of a simple mode, a reversing mode or a double reversing mode. Reference of FIG. 3, when the simple mode is selected, the document on the document table 20 is introduced onto the transparent plate 8 via the document introduction passage 40 and is placed at a predetermined position (where the trailing end of the document is in contact with the document position restricting member 10) on the transparent plate 8. Then, the electrostatic copying machine 2 effects scanning and exposure of one surface (the lower surface) of the document. The document is then discharged onto the first document receiving tray 94 via the common passage 136 and the first branched passage 138 in the document delivery passage 132. When the reversing mode is selected, the document on the document table 20 is introduced onto the transparent plate 8 via the document introduction passage 40 and is placed at a predetermined position on the transparent plate 8. Then, the electrostatic copying machine 2 effects scanning and exposure of one surface of the document. The document on the transparent plate 8 then enters into the first branched passage 138 from the common passage 136 of the document delivery passage 132 and is introduced into the re-introduction passage 134 from the first branched passage 138. Consequently, the document is turned over and is placed at a predetermined position on the transparent plate 8. The electrostatic copying machine 2 then effects scanning and exposure of the other surface of the document. Thereafter, the document is discharged onto the second document receiving tray 168 via the common passage 136 and the second branched passage 140 of the document delivery passage 132. When the double reversing mode is selected, the document introduced onto the transparent plate 8 from the document table 20 via the document introduction passage 40 is not positioned on the transparent plate 8 but is conveyed onto the common passage 136 of the document delivery passage 132, re-introduced onto the transparent plate 8 via the first branched passage 138 and the re-introduction passage 134, turned over and placed at a predetermined position on the transparent plate 8. The electrostatic copying machine 2 then executes scanning and exposure of one surface (the lower surface) of the document. The document is then re-introduced onto the transparent plate 8 from the transparent plate 8 via the common passage 136 and the first branched passage 138 of the document delivery passage 132 and the re-introduction passage 134. The document is then turned over again and placed again at the predetermined position on the transparent plate 8. The electrostatic copying machine 2 then executes scanning and exposure of the other surface of the document. The document is then discharged onto the first document receiving tray 94 via the common passage 136 and first branched passage 138 of the document delivery passage 132. Details of the document conveying system in the simple mode, reversing mode and double reversing mode have been clearly described in the specification and drawings of U.S. Pat. No. 5,027,162, issued Jun. 25, 1991 and entitled Automatic Document Conveying Device. Therefore, its detailed description is not repeated in this specification.

In the above-mentioned constitution of the diagramed automatic document conveying device 4 constituted according to the present invention, attention should be given to the following points. In the diagramed automatic document conveying device 4, the central main portion 14, that includes the movable main portion frame member 70 and the document conveying means (conveyer belt mechanism) 74 mounted thereon, is constituted quite separately from the document introduction portion 12 and the document delivery and re-introduction portion 16. No mutual action of driving force or no mutual action of pressing force exists between the main portion 14 and the document introduction portion 12 or between the main portion 14 and the document delivery and re-introduction portion 16. The introduction portion drive source 69, main portion drive source 89 and delivery portion drive source 165 are arranged in the document introduction portion 12, main portion 14 and document delivery portion 16, respectively, and there does not exist any drive coupling relationship between the main portion 14 and the document introduction portion 12 or between the main portion 14 and the document delivery portion 16. Furthermore, the pairs of rollers that press each other and that work in cooperation together are not so disposed that one roller of a pair is on the main portion 14 and the other of that pair is the document introduction portion 12 or the document delivery and re-introduction portion 16. Therefore, no mutually pressing relationship exists at all between the main portion 14 and the document introduction portion 12 or between the main portion 14 and the document delivery and re-introduction portion 16. Thus, even when open and close operation of the movable main portion frame member 70 is carried out repetitively, the movable main portion frame member 70 of the main portion 14 and the document conveying means (conveyer belt mechanism) 74 are not adversely affected by the driving force or the pressing force and are stably placed at the required position with respect to the transparent plate 8 maintaining sufficiently high precision.

Central Main Portion

Next, detailed description will be given in respect to the central main portion 14. As described already with reference to FIGS. 1 to 3, the central main portion 14 includes the movable main portion frame member 70 and the document conveyer means (conveyer belt mechanism) 74 mounted on the main portion frame member 70. The main portion frame member 70 is mounted on the upper surface of the housing 6 of the electrostatic copying machine 2 by a pair of hinge mechanisms 72 disposed a set distance apart in the conveying direction so as to pivot between the closed position shown in FIGS. 1 and 3 and the open position shown in FIG. 2.

With reference to FIGS. 4 and 5, each of the pair of hinge mechanisms 72, which per se may be of a known form, has a stationary member 180 and a pivoting member 182. The stationary member 180 has a bottom wall 184 and a pair of upright support walls 186 that extend upwardly from both side edges of the bottom wall. The stationary member 180 is secured in a predetermined position on the upper surface of the housing 6 by screwing the fastening screws 188 (FIG. 6) into the upper wall of the housing 6 of the electrostatic copying machine 2 through the bottom wall 184. Each of the pair of upright support walls 186 has mounting holes 190 and 192. On the other hand, the pivoting member 182 has an upper wall 194 and a pair of side walls 196 that hang downwardly from both side edges of the upper wall 194. A hole 198 is formed at a rear end of the upper wall 194. A mounting hole 200 is formed at the rear end of each of the side walls 196, and a mounting hole 202 is formed at the front end of each of the side walls 196. Further, an L-shaped notch 204 is formed in the middle portion of each of the side walls 196 extending upwardly from the lower edge thereof and then extending rearwardly. As shown in FIG. 4, a coupling pin 205 is inserted through mounting holes 190 formed in the upright support walls 186 of the stationary member 180 and mounting holes 200 formed in the side walls 196 of the pivoting member 182, whereby the pivoting member 182 is pivotably mounted on the stationary member 180 with the pin 205 as a center. The ends of a pin 206 are pivotably fitted to the mounting holes 192 formed in the pair of upright support walls 186 of the stationary member 180. To the pin 206 are fixed two cylindrical members 208 that protrude substantially perpendicularly from the central portion thereof. On the other hand, the ends of a pin 210 are inserted in the notches 204 formed in the side walls 196 of the pivoting member 182. To the pin 210 are fastened two round rod members 212 that protrude substantially perpendicularly from the central portion thereof. Compression coil springs 214 are fitted over the round rod members 212 of the pin 210, and the round rod members 212 of the pin 210 are slidably inserted in the cylindrical members 208 of the pin 206. The coil springs 214 are positioned between the pin 210 and the cylindrical members 208 and work to resiliently urge the pivoting member 182 in the counterclockwise direction as viewed from the left front side in FIG. 4. When the pivoting member 182 pivots relative to the stationary member 180, the round rod members 212 slide relative to the cylindrical members 208.

With reference to FIGS. 5, 6 and 9 to 11, the movable main portion frame member 70 mounted on the upper surface of the housing 6 via the pair of hinge mechanisms 72 includes a support base member 216 and a cover member 218 (FIGS. 1 to 3 and 15) mounted on the support base member 216. The support base member 216 has a pair of coupling members 220 and a pair of support plates 222 secured to the coupling members 220, respectively. As clearly diagramed in FIG. 5, each of the pair of coupling members 220 has a bottom wall 224 and upright side walls 226 that extends upwardly from both side edges of the bottom wall 224. Rectangularly protruded pieces 228 are formed outwardly protruding in the lateral direction from the upper edges at the rear portion of the side walls 226. A mounting hole 230 is formed in the middle portion of the side walls 226. A protruded piece 229 is laterally protruded from the rear end of one of the side walls 226 (side wall 226 positioned on the left front side of FIG. 5), and a threaded hole 231 is formed in the protruded piece 229. As clearly diagramed in FIGS. 6 and 9, the coupling member 220 is disposed on the underside of the pivoting member 182 of the hinge mechanism 72, and the side walls 226 of the coupling member 220 are positioned on the outside of the side walls 196 of the pivoting member 182. A mounting pin 232 is inserted through the mounting holes 230 formed in the side walls 226 of the coupling member 220 and to the mounting holes 202 formed in the front end of side walls 196 of the pivoting member 182, whereby the coupling member 220 of the support base member 216 is pivotably mounted on the pivoting member 182 of the hinge mechanism 72 with the pin 232 as a center. As clearly shown in FIGS. 6 and 10, the rear end portions of the support plates 222 are fixed to the front end portions of the coupling members 220. Three holes 234 are formed in the front end portion of the coupling member 220, and corresponding three threaded holes 236 (FIG. 11) are formed in the rear end portion of the support plate 222 that is positioned under the front end portion of the coupling member 220. Coupling screws (not shown) are screwed into the threaded holes 236 via the holes 234 so that the rear end portion of the support plate 222 is secured to the front end portion of the coupling member 220. The support plate 222 is secured to the front end portion of the coupling portion 220, and extends forward from its cantilevered rear end portion.

The support plates 222 in the diagramed embodiment are made of an extrusion-molded aluminum material and have a channel shape with a band plate portion 238 and two side walls 240 that extend upwardly from the two side edges of the band plate portion 238. The movable main portion frame member 70 that can be manually pivoted to open or close should has a weight as light as possible to facilitate opening and closing. It is therefore desired to decrease the weight of the support plate 222 of the support base member 216 as much as possible. On the other hand, as will be described later in detail, the document conveying means (conveyer belt mechanism) 74 is mounted on the support base member 216, and the support plate 222 should have a strength great enough to support the document conveying means 74. As described above, the support plate 222 extends forward from the cantilevered rear end portion thereof. Therefore, the required geometrical moment of inertia of the support member 222 gradually increases from the front end toward the rear portion thereof or, in other words, the geometrical moment of inertial gradually decreases from the rear end toward the front portion thereof, enabling the support member 222 to exhibit strength enough for supporting the document conveying means 74. In view of the above fact, the support plate 222 according to the present invention is so formed as to exhibit a geometrical moment of inertia that decreases toward the front portion from the rear portion thereof, in order to decrease the weight yet maintaining the required strength of the support plate 222. In the diagramed embodiment, the support plate 222 has a plurality of weight-reducing openings 242 formed in the lengthwise direction of the support plate 222 at suitable distances in order to reduce the weight of the support plate 222. The openings 242 are small in the rear portion and become larger toward the front portion. Therefore, the geometrical moment of inertia decreases from the rear portion of the support member 222 toward the front portion thereof. It is also allowable to suitably change the number of openings instead of, or in addition to, changing the size of the openings 242. As required, furthermore, the amount of upward protrusion of the side walls 240 of the support plate 222 may be decreased from the rear portion toward the front portion in order to decrease the geometrical moment of inertia of the support plate 222 from the rear portion toward the front portion thereof.

Figure 10:
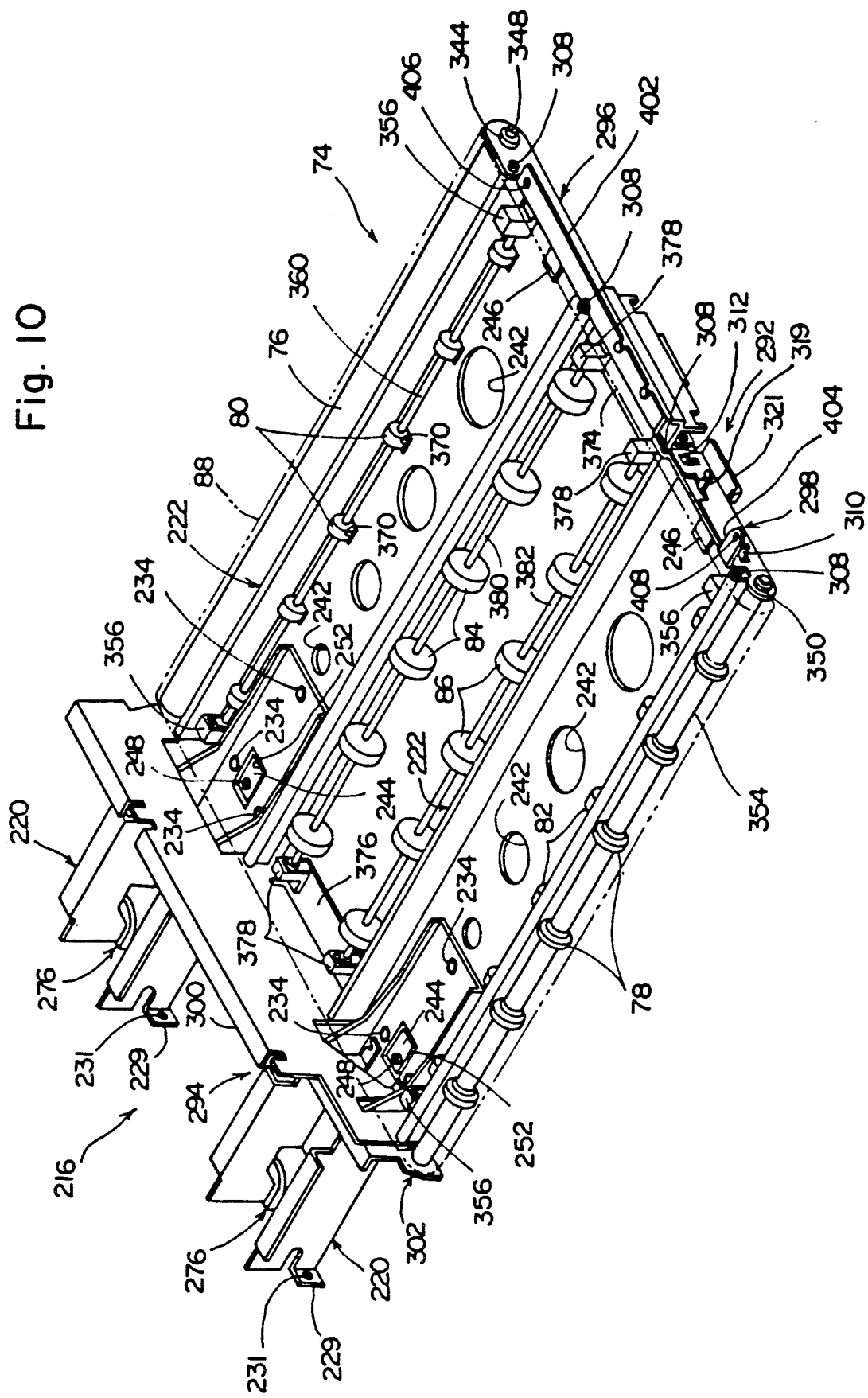
FIG. 10 is a perspective view illustrating the support base member of the central main portion in the automatic document conveying device of FIG. 1 and document conveying means (conveyer belt mechanism) mounted thereon.
Figure 11:
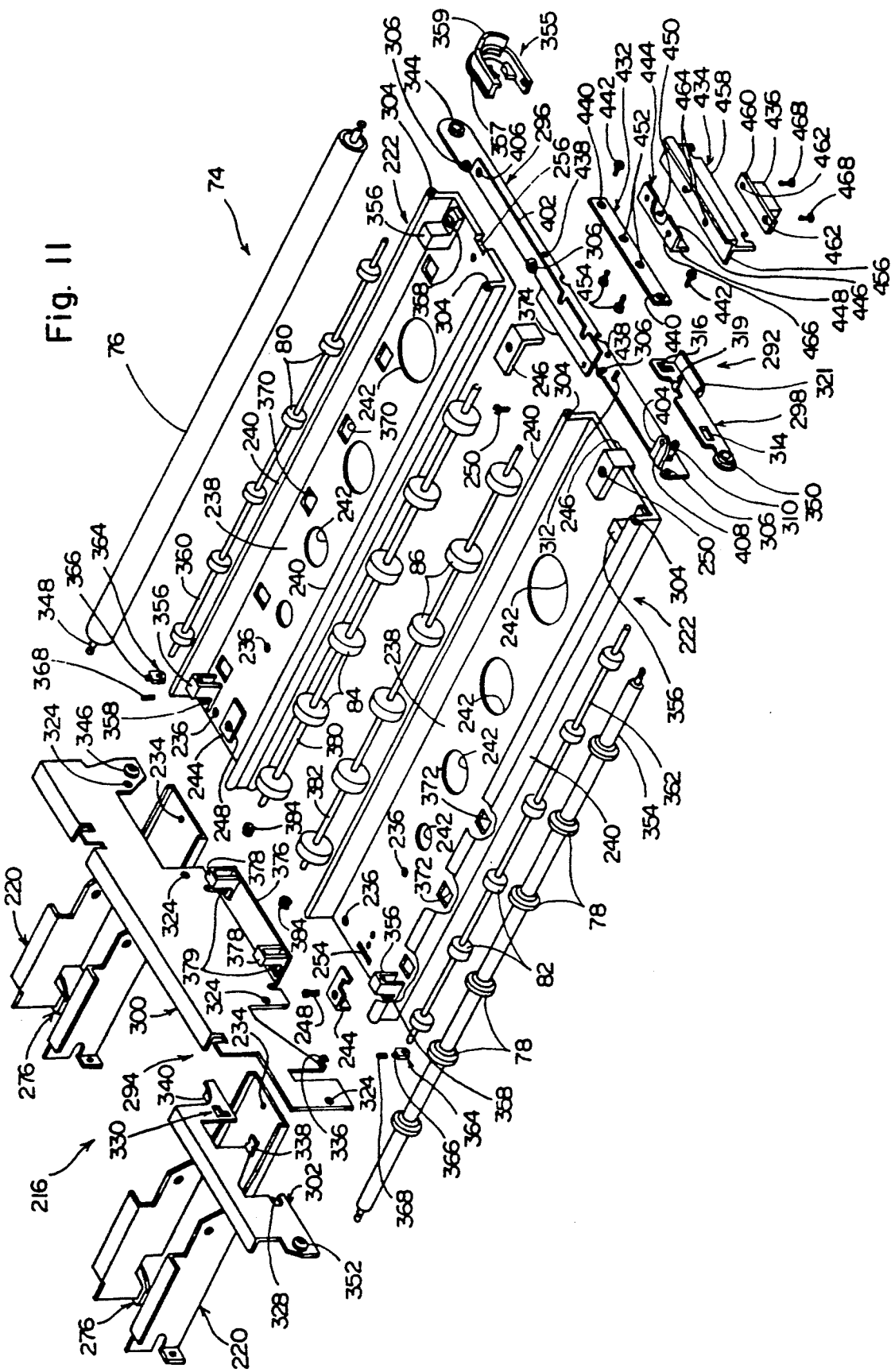
FIG. 11 is a perspective view illustrating, in a disassembled manner, the support base member of the central main portion in the automatic document conveying device of FIG. 1 and document conveying means (conveyer belt mechanism) mounted thereon.

With reference to FIGS. 10 and 11, positioning contact pieces 244 and 246 are fastened by the fastening screws 248 and 250 to the rear end portion and the front end portion of the pair of support plates 222 of the support base member 216. A rectangular opening 252 is formed in the front end portion of the coupling member 220 of the support base member 216, and the contact piece 244 is secured to the rear end portion of the support plate 222 through the opening 252. The contact pieces 244 and 246 have downwardly extending legs. The legs of the contact pieces 244 downwardly protrude through the openings 254 formed in the rear portion of the support plates 222, and the legs of the contact pieces 246 downwardly protrude through the notches 256 formed in the front end of the support plates 222. When the movable main portion frame member 70 is brought to the closed position shown in FIGS. 1 and 3, the downwardly protruding legs of the contact pieces 244 and 246 come in contact with the transparent plate 8 that is disposed on the upper surface of the housing 6, and the document conveying means (conveyer belt mechanism) 74 mounted on the support base member 70 is positioned as required with respect to the transparent plate 8.

Figure 9:
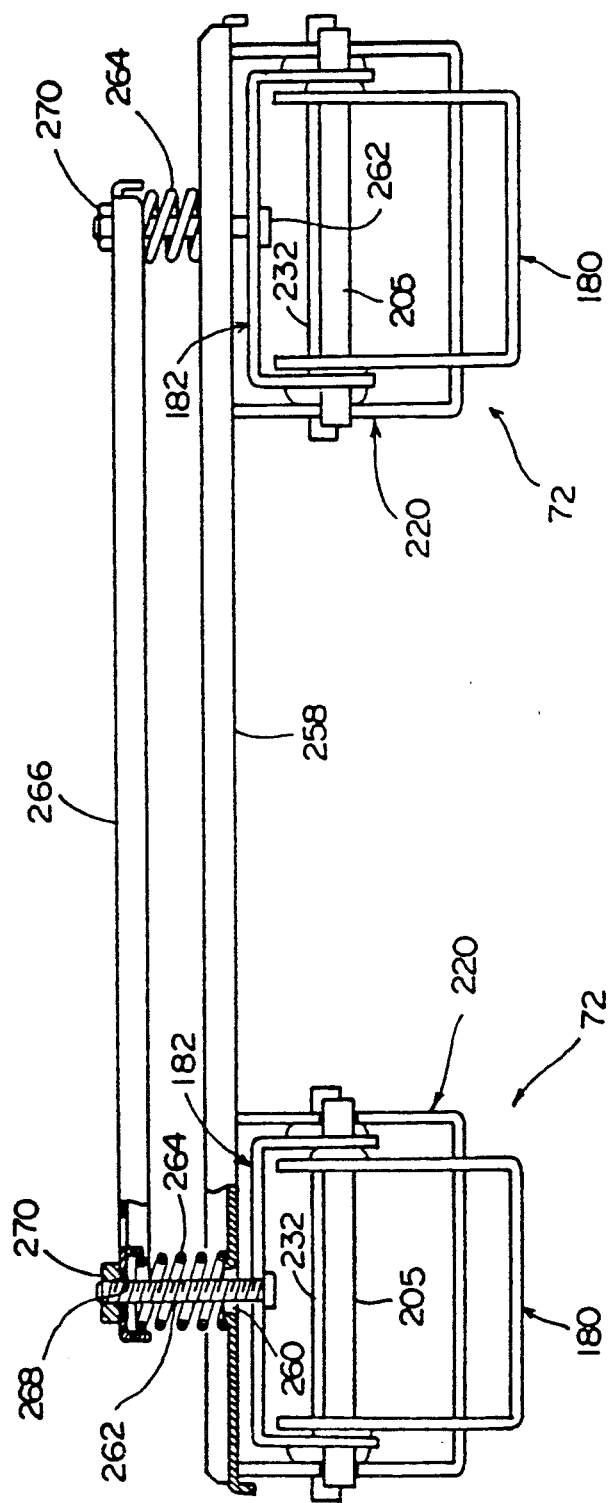
FIG. 9 is a rear view showing, partly in cross section, the hinge mechanism in the automatic document conveying device of FIG. 1 and the support base member of the central main portion mounted thereon.

With reference to FIGS. 6 and 9, a slender pressing plate 258 is disposed extending in the conveying direction and spanning across the pair of coupling members 220 on the rear end portions (portions at the back of the protruded pieces 228) of upper edges of side walls 226 of the pair of coupling members 220 of the support base member 216. In the pressing plate 258 are formed holes 260 corresponding to the holes 198 formed in the upper walls 194 of the pivoting members 182 of the pair of hinge mechanisms 72. Bolts 262 protrude upwardly through the holes 194 of the pivoting members 182 and the holes 260 of the pressing plates 258. The head of the bolt 262 is anchored to the lower surface of the upper wall 194 of the pivoting member 182. A compression spring 264 is fitted to the bolt 262 to constitute resiliently urging means. A restricting plate 266 is disposed extending in the conveying direction and spanning across the two coil springs 264 at an upper position thereof. Holes 268 are formed at both ends of the restricting plate 266, and the bolts 262 protrudes upwardly through these holes 268. Nuts 270 are screwed to the ends of the bolts 262. As will be easily comprehended with reference to FIGS. 6 and 9, the compression springs 264 resiliently urge the coupling members 220 of the support base member 216 in the clockwise direction in FIG. 6 with respect to the pivoting members 182 of hinge mechanisms 72. The resilient urging force of the compression coil springs 264 can be suitably adjusted by adjusting the nuts 270 screwed to the bolts 262.

With reference to FIG. 6, the document conveying means (conveyer belt mechanism) 74 is mounted on the support base member 216, and the cover member 218 is further mounted thereon as will be described later. The weight of the support base member 216 and of the constitutional elements mounted thereon, i.e., the acting center of weight or the center of gravity G of the central main portion 14, is located considerably in front of the position where the pivoting members 182 of the hinge mechanisms 72 are pivotably coupled to the coupling members 220 of the support base member 216, i.e., located considerably in front of the position of center axis of the mounting pin 232 (the center of gravity G of the central main portion 14 can be brought into agreement with the center axis of the mounting pin 232 by excessively forwardly extending the pivoting members 182 of the hinge mechanisms 72, but this results in an increase in the size, weight and cost of the hinge mechanisms 72). When the center of gravity of the central main portion 14 is located considerably in front of the center axis of the mounting pin 232, the weight acting on the center of gravity G of the central main portion 14 produces a moment of rotation to turn the central main portion 14 in the counterclockwise direction in FIG. 6. Such a moment of rotation is the greatest when the central main portion 14 is located at the closed position shown in FIG. 6. When the central main portion 14 is moved toward the open position shown in FIG. 2, the distance in the horizontal direction between the center axis of the mounting pin 232 and the center of gravity of the central main portion 14 in the horizontal direction decreases gradually, and the moment of rotation gradually decreases, too. The distance is usually considerably great when the central main portion 14 is located at the closed position, and there arises the problem as described below unless some countermeasure is taken against the moment of rotation. When the movable main portion frame member 70 is located at the closed position shown in FIGS. 1 and 3, it is important that, as described above, the legs of the positioning contact pieces 244 and 246 are brought into contact with the transparent plate 8, and thus, the document conveying means (conveyer belt mechanism) 74 is positioned as desired with respect to the transparent plate 8. Due to the action of moment of rotation, however, the support base member 216 is forcibly rotated in the counterclockwise direction in FIG. 6, causing the document conveying means 74 mounted on the support base member 216 to be slightly rotated in the counterclockwise direction from the desired position in FIG. 6. According to the present invention, however, the compression coil springs 264 give a resiliently urging force to the support base member 216 in the clockwise direction in FIG. 6. The magnitude of the resiliently urging force is set to such a value that the support base member 216 or the central main portion 14 receives a balancing moment of rotation in the counterclockwise direction that nearly corresponds to the above-mentioned moment of rotation in the counterclockwise direction caused by the weight of the central main portion 14 under the condition where the central main portion 14 is located at the closed position shown in FIG. 6. Thus, the document conveying means 74 is reliably prevented from being pivoted from the desired position.

Figure 8:
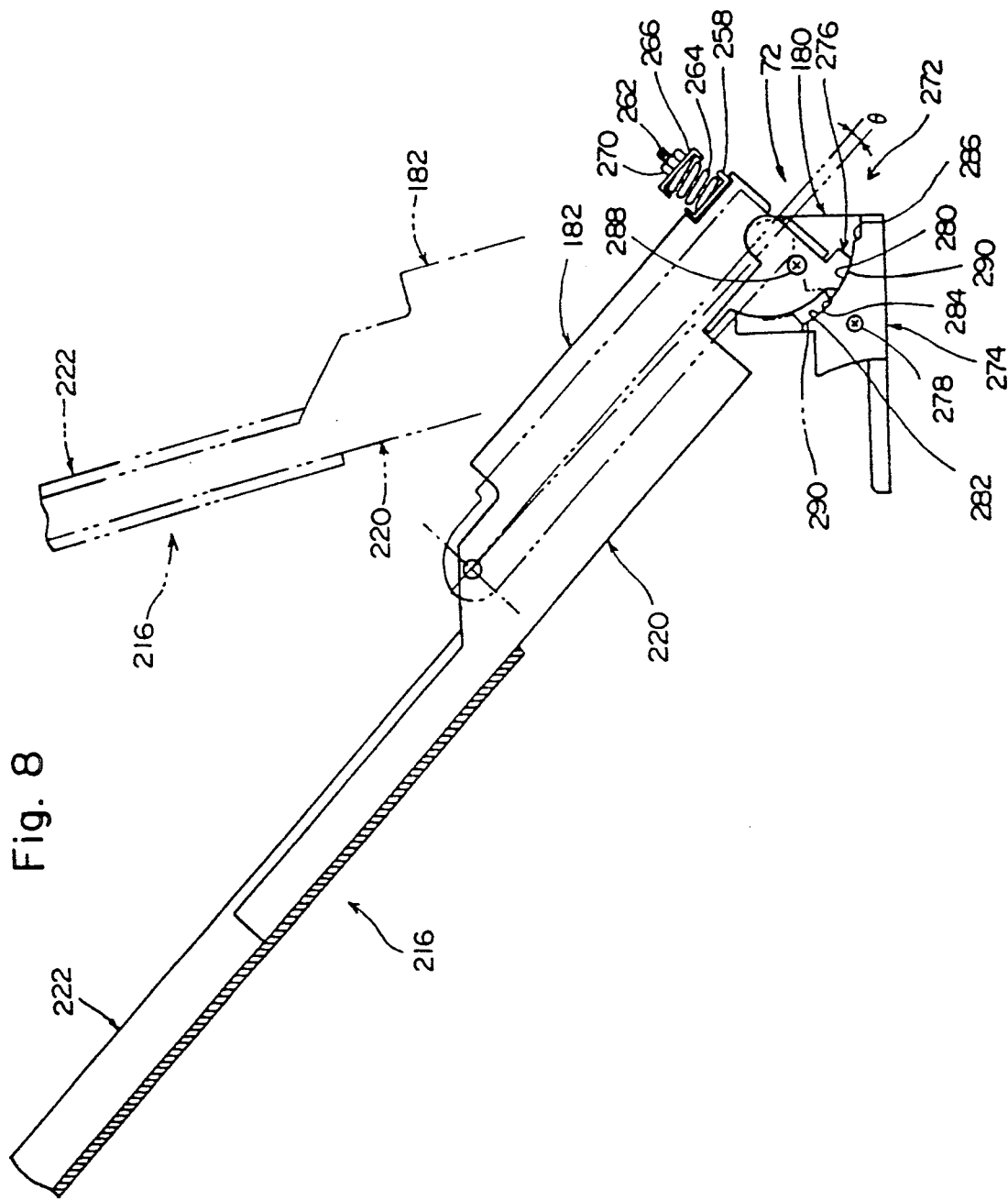
FIG. 8 is a side view illustrating the hinge mechanism in the automatic document conveying device of FIG. 1 and the support base member of the central main portion mounted thereon under the condition where the support base member is opened.

Referring now to FIGS. 5, 7 and 8, brake mechanisms 272 are disposed in relation to the pair of hinge mechanisms 72. Each of the brake mechanisms 272 is constituted by a stationary brake piece 274 and a swingable brake piece 276. The stationary brake piece 274, which can be made of a suitable synthetic resin, is secured by a set-screw 278 (FIG. 7) to the outer surface of one of the pair of upright support walls 186 (upright support wall 186 of the right upper side in FIG. 5) of the stationary member 180 of the hinge mechanism 72. As clearly shown in FIGS. 7 and 8, a first arcuate inner peripheral surface 280 and a second arcuate inner peripheral surface 282 are formed on the upper surface of the stationary brake piece 274. In contrast with the first arcuate inner peripheral surface 280, the second arcuate inner peripheral surface 282 is slightly displaced in a direction away from the pivotable brake piece 276, and an intermediate step portion 284 is formed between them. Further, a front step portion 286 is formed on the front side (right side in FIGS. 7 and 8) of the first arcuate inner peripheral surface 280. On the other hand, the pivotable brake piece 276, which can likewisely be made of a suitable synthetic resin, is secured by a set-screw 288 (FIG. 7) to the lower edge portion at the rear end of one of the pair of side walls 226 (side wall 226 of the right upper side in FIG. 5) of the coupling member 220 in the support base member 216 of the main portion frame member 70. As clearly shown in FIGS. 7 and 8, the pivotable brake piece 276 has an arcuate outer peripheral surface 290 formed at a rear portion on the lower surface thereof.

Operation of the above-mentioned brake mechanism 272 will now be described. When the main portion frame member 70 is at the closed position as shown in FIG. 7, the pivotable brake piece 276 is separated from the stationary brake piece 274, and the brake mechanism 272 is in the non-operating condition. When the main portion frame member 70 is pivoted to open in the clockwise direction in FIGS. 7 and 8, the arcuate outer peripheral surface 290 of the pivotable brake piece 276 is pressed against the first arcuate inner periphery surface 280 of the stationary brake piece 274 as shown in FIG. 8. As will be understood from the comparison of FIG. 7 with FIG. 8, when the arcuate outer peripheral surface 290 of the pivotable brake piece 276 passes over the front step portion 286 of the stationary brake piece 274 and is positioned against the first arcuate inner peripheral surface 280, the coupling member 220 (i.e., the main portion frame member 70) is rotated by an angle θ in the counterclockwise direction in FIG. 8 with the mounting pin 232, by which the coupling member 220 is mounted on the pivoting member 182 of the hinge mechanism 72, as a center. Therefore, the arcuate outer peripheral surface 290 of the pivotable brake piece 276 passes over the front step portion of the stationary brake piece 274. The moment of rotation that stems from the weight of the central main portion 14 as described above and that acts on the central main portion 14 to turn it in the counterclockwise direction in FIG. 8, decreases gradually as the central main portion 14 is turned to open from its closed position. Under the condition shown in FIG. 8, therefore, the balancing moment of rotation in the clockwise direction exerted on the central main portion 14 by the compression coil springs 264 becomes greater than the above-mentioned angular moment caused by the center of gravity of the central main portion 14. Under the condition shown in FIG. 8, therefore, the arcuate outer peripheral surface 290 of the pivotable brake piece 276 is forcibly pressed against the first arcuate inner peripheral surface 280 of the stationary brake piece 274 due to the balancing moment of rotation, and due to the frictional force between the two, the braking force acts on the pivoting motion of the central main portion 14. Thus, braking action is exerted on the central main portion 14 which pivots to open or close within a range of the first arcuate inner peripheral surface 280 between the front step portion 286 and the intermediate step portion 284 of the stationary brake piece 274 (within a range of about 20° to 75° of opening angle from the closed position of the central main portion 14), and the central main portion 14 is maintained at any angular position desired by the operator. The braking force is relatively small, and the force for holding the central main portion 14 is relatively small, too. As the central main portion 14 is further turned to open, the arcuate outer peripheral surface 290 of the pivotable brake piece 276 passes over the intermediate step portion 284 and is pressed against the second arcuate outer peripheral surface 282 as indicated by a two-dot chain line in FIG. 8. In this case, the coupling member 220 is turned by some angle (which may correspond to the aforementioned angle θ) in the clockwise direction in FIG. 8 with the mounting pin 232 as a center. As will be understood with reference to FIG. 8, in order to return the arcuate outer peripheral surface 290 of the pivotable brake piece 276 to the condition where it is passes over the intermediate step portion 284 and is pressed against the first arcuate inner peripheral surface 280 from the second arcuate inner peripheral surface 282 of the stationary brake piece 274 by turning the central main portion 14 toward the closing direction, it is necessary to turn the coupling member 220 (i.e., central main portion 14) by some angle in the counterclockwise direction in FIG. 8 against the resiliently urging action of the compression coil springs 264, such that the arcuate outer peripheral surface 290 of the pivotable brake piece 276 rides across the intermediate step portion 284 of the stationary brake piece 274. The force which is stronger to some extent is necessary to turn the coupling member 220 in the counterclockwise direction against the reisilently urging action of the compression coil springs 264 and, hence, the central main portion 14 is held relatively stably at an angular position at which the arcuate outer peripheral surface 290 of the pivotable brake piece 276 is pressed onto the second arcuate inner peripheral surface 282 after passing over the intermediate step portion 284 of the stationary brake piece 274 (about 80° of opening angle from the closed position of the central main portion 14).

Figure 12:
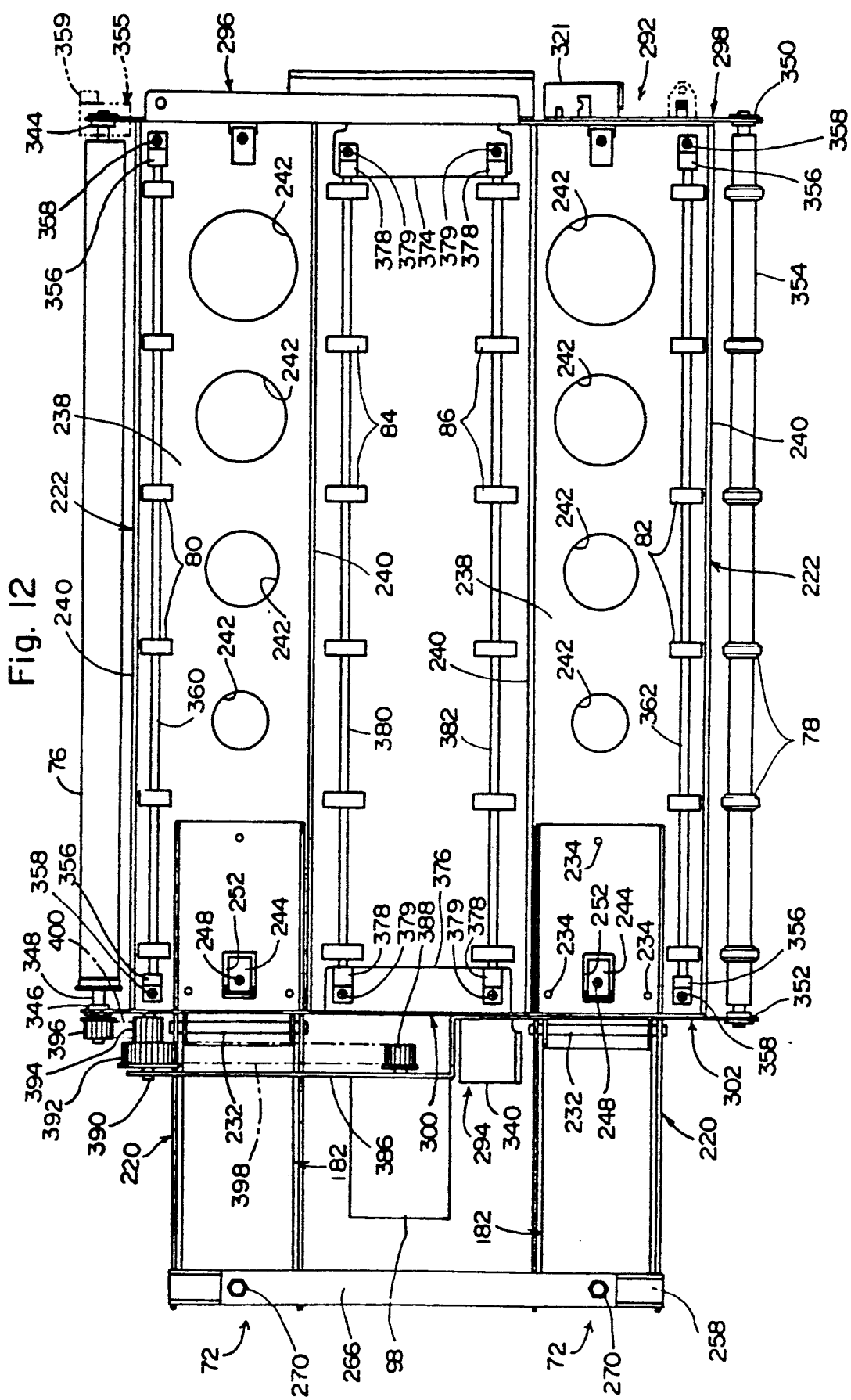
FIG. 12 is a plan view illustrating the support base member of the central main portion in the automatic document conveying device of FIG. 1 and document conveying means (conveyer belt mechanism) mounted thereon.

With reference to FIGS. 10 to 12, the document conveying means 74 constituted by the conveyer belt mechanism is mounted on the support base member 216 of the main portion frame member 70 in the central main portion 14. The document conveying means 74 includes front-side support means 292 and rear-side support means 294. The front-side support means 292 has a driven-side support member 296 and a follower-side support member 298 and, similarly, the rear-side support means 294 has a driven-side support member 300 and a follower-side support member 302. The driven-side support member 296 of the front-side support means 292 is constituted by a slender plate member that extends in the conveying direction (up-and-down direction in FIG. 12). Threaded holes 304 are formed in the front ends at the upper end portions of both side walls of the pair of support members 222 in the support base member 216, and four mounting holes 306 are formed in the driven-side support member 296 to correspond thereto. Set-screws 308 are screwed into the threaded holes 304 through the mounting holes 306, whereby the driven-side support member 296 is secured to the front end of the support plate 222. The follower-side support member 298 of the front-side support means 292 is constituted by a plate member that extends in the conveying direction. The follower-side support member 298 is mounted on the driven-side support member 296 to move over a required range in the conveying direction. Referring, further, to FIGS. 10, 11, 13-A and 13-B, a forwardly protruded guide pin 310 and a lock pin 312 are studded on the driven-side support member 296 at the follower-side end (left lower end in FIG. 11). On the other hand, a guide slot 314 and a lock slot 316 are formed in the follower-side support member 298. The guide slot 314 extends in the conveying direction. The lock slot 316 has a relative movement-permitting portion 318 that extends in the conveying direction and a lock portion 320 that extends nearly perpendicularly to the conveying direction. The guide pin 310 is inserted in the guide slot 314 and the lock pin 312 is inserted in the lock slot 316, so that the follower-side support member 298 is mounted on the driven-side support member 296. The driven-side support member 298 has an engaging piece 319 that protrudes forwardly from the upper edge thereof and a grip piece 321 that extends forward from the lower edge thereof. As clearly shown in FIGS. 13-A and 13-B, resiliently urging means 322 constituted by a pulling spring is provided between the guide pin 310 of the driven-side support member 296 and the engaging piece 319 of the follower-side support member 298. When the lock pin 312 is positioned in the relative movement-permitting portion 318 of the lock slot 316 as shown in FIG. 13-A, the guide pin 310 moves in the conveying direction in the guide slot 314, so that the lock pin 312 moves in the conveying direction in the relative movement-permitting portion 318 of the lock slot 316, and the driven-side supporting member 298 is allowed to move in the conveying direction with respect to the driven-side support member 296. Resiliently urging means 322 resiliently urges the driven-side support member 298 leftwardly in FIG. 13-A, i.e., toward the direction to extend the full length of the front-side support means 292 defined by the driven-side support member 296 and the driven-side support member 298 in the conveying direction. As will be described later in further detail, a driven roller 76 and a follower roller 78 are mounted between the front-side support means 292 and the rear-side support means 294 maintaining a distance in the conveying direction, and an endless belt 88 is wound round the driven roller 76 and the follower roller 78. The endless belt 88 is maintained in its stretched condition due to the resiliently urging action of the resiliently urging means 322. Under this condition, the full length between the driven-side support member 296 and the follower-side support member 298 is not the greatest possible length but is slightly shorter than it. The grip piece 321 formed in the follower-side support member 298 is gripped or is touched by a finger, and the follower-side support member 298 is moved by a predetermined length rightwards in FIGS. 13-A and 13-B, i.e., toward the direction to shorten the full length of the front-side support means 292 defined by the driven-side support member 296 and the follower-side support member 298 against the resiliently urging action of the resiliently urging means 322. Then, the right end portion of the follower-side support member 298 is slightly moved upwardly in FIGS. 13-A and 13-B, so that the lock pin 312 is positioned in the lock portion 320 of lock slot 316 as shown in FIG. 13-B. Due to the action of the resiliently urging means 322, therefore, the follower-side support member 298 is prevented from returning to the left in FIG. 13-B; i.e., the follower-side support member 298 is locked under the full-length contracted condition as shown in FIG. 13-B. Thus, the lock pin 312 and the lock slot 316 work in cooperation to constitute locking means. In FIGS. 13-A and 13-8, if the right end portion of the follower-side support member 298 is moved slightly downwards such that the lock pin 312 is positioned in the relative movement-permitting portion 318 of lock slot 316, the locking action is released and the follower-side support member 298 is returned to the condition shown in FIG. 13-A due to the action of the resiliently urging means 322. A driven-side support member 300 of the rear-side support means 294 is also constituted by a plate-like member that extends in the conveying direction. Here, the height of the driven-side support member 300 of the rear-side support means 294 in the up-and-down direction is considerably greater than the height in the up-and-down direction of the driven-side support member 296 of the front-side support means 292. Threaded holes (not shown) are formed in the upper rear ends of both side walls of the pair of support plates 222 in the support base member 216, and four mounting holes 324 are formed in the driven-side support member 300 to correspond thereto. Set-screws (not shown) are screwed into the threaded holes through the mounting holes 324, and the driven-side support member 300 is secured to the rear ends of the support plates 222. The driven-side support member 302 of the rear-side support means 294, too, is constituted by a plate-like member that extends in the conveying direction, and its height in the up-and-down direction is considerably greater than the height in the up-and-down direction of the follower-side support member 298 of the front-side support means 292. The follower-side support member 302 is mounted on the driven-side support member 300 to move over a required range in the conveying direction. If described with reference to FIGS. 10 and 11, and FIGS. 14-A and 14-8, a rearwardly protruding guide pin 325 and a lock pin 326 are studded on the driven-side support member 300 at the follower-side ends (left lower end portions in FIG. 11). An expanded head is formed at the protruded end of the guide pin 325. On the other hand, a guide slot 328 and a lock slot 330 are formed in the follower-side support member 302. The guide slot 328 extends in the conveying direction and the end on its driven side is open. The lock slot 330 has a relative movement-permitting portion 332 extending in the conveying direction and a lock portion 334 extending nearly perpendicularly to the conveying direction. The guide pin 325 is inserted in the guide slot 328 and the lock pin 326 is inserted in the lock slot 330, so that the follower-side support member 302 is inserted in the driven-side support member 300. The driven-side support member 300 has an engaging piece 336 that forwardly protrudes from the lower edge thereof, and the follower-side support member 302 has an engaging piece 338 that forwardly protrudes from the lower edge thereof. The follower-side support member 302 further has a grip piece 340 (FIGS. 11 and 12) that rearwardly extends from the lower edge thereof. As clearly shown in FIGS. 14-A and 14-B, resiliently urging means 342 constituted by a pulling spring is disposed between the engaging piece 336 of driven-side support member 300 and the engaging piece 338 of follower-side support member 302. When the lock pin 326 is positioned in the relative movement-permitting portion 332 in the lock slot 330 as shown in FIG. 14-A, the guide pin 325 is allowed to move in the guide slot 326 in the conveying direction, and the lock pin 326 moves within the relative movement-permitting portion 332 in the lock slot 330 in the conveying direction, so that the follower-side support member 302 is allowed to move in the conveying direction relative to the driven-side support member 300. The resiliently urging means 342 resiliently urges the follower-side support member 302 toward the left in FIG. 14-A, i.e., toward the direction to extend in the conveying direction the full length of the rear-side support means 294 that is defined by the driven-side support member 300 and the follower-side support member 302. Like the case mentioned in connection with the front-side support means 292, the endless belt 88 (FIGS. 2 and 3) is maintained in its stretched condition by the resiliently urging action of the resiliently urging means 342. Under this condition, the full length between the driven-side support member 300 and the follow-side support member 302 is not the greatest possible length but is slightly shorter than it. The grip piece 340 of the follower-side support member 302 is gripped or is touched by finger, and the follower-side support member 302 is moved by a predetermined length toward the right in FIGS. 14-A and 14-B, i.e., toward the direction to shorten the full length of the rear-side support means 294 defined by the driven-side support member 300 and the follower-side support member 302 against the resiliently urging action of the resiliently urging means 342. Then, the right end portion of the follower-side support member 302 is slightly moved upwards in FIGS. 14-A and 14-B, so that as shown in FIG. 14-B, the lock pin 326 is positioned in the lock portion 334 of lock slot 330. The follower-side support member 302 is then prevented, by the action of the resiliently urging means 342, from returning to the left in FIG. 14-B, and is locked under the full-length contracted condition that is shown in FIG. 14-B. Thus, the lock pin 326 and the lock slot 330 work in cooperation to constitute locking means. If the right end portion of the follower-side support member 302 is slightly moved downwards in FIGS. 14-A and 14-B so that the lock pin 326 is positioned in the relative movement-permitting portion 332 of lock slot 330, the locking action is released and the follower-side support member 302 is returned back to the condition shown in FIG. 14-A owing to the action of the resiliently urging means 342.

With reference to FIGS. 10 to 12, a shaft member 348 is rotatably fitted via bearing sleeves 344 and 346 between one end (upper end portion of FIG. 12) of the driven-side support member 296 of the front-side support means 292 and one end (upper end portion in FIG. 12) of the driven-side support member 300 of the rear-side support means 294, and a driven roller 76 that continuously extends in the direction of width (right-and-left direction in FIG. 12) is secured to the shaft member 348. Furthermore, a shaft member 354 is rotatably fitted via bearing sleeves 350 and 352 between one end (lower end portion in FIG. 12) of the follower-side support member 298 of the front-side support member 292 and one end (lower end portion in FIG. 12) of the follower-side support member 302 of the rear-side support means 294, and a plurality of follower rollers 78 are fastened to the shaft member 354 at suitable distances in the axial direction thereof. As clearly shown in FIG. 3, an endless belt 88 is wound round the driven roller 76 and the follower roller 78. In the diagramed embodiment constituted according to the present invention, the driven-side support member 296 and the follower-side support member 298 constituting the front-side support means 292 have a size in the up-and-down direction which is smaller than the diameters of the driven roller 76 and of the follower roller 78, and the upper running portion and the lower running portion of the endless belt 88 wound round the driven roller 76 and the follower roller 78 are positioned above and below the driven-side support member 296 and the follower-side support member 298, respectively. In view of the above fact, a belt locking member 355 (FIGS. 11 and 12) is mounted on one end (upper end portion in FIG. 12) of the driven-side support member 296 of the front-side support means 292. The belt locking member 355, which may be made of a suitable synthetic resin, has an inside shape that corresponds to the outer shape at one end of the driven-side support member 296, and is detachably and resiliently engaged with one end of the driven-side support member 296. On the inside of the belt locking member 355 is formed a locking flange 357 that is positioned opposed to one side edge of the endless belt 88 and that prevents the endless belt 88 from moving forward. Further, on the outside of the belt locking member 355 is formed a grip piece 359 that can be gripped by hand at the time when the belt locking member 355 is to be mounted on, or removed from, the driven-side support member 296. With reference to FIGS. 3 and 10 to 12, the aforementioned pressing rollers 80, 82, 84 and 86 are mounted between the front-side support means 292 and the rear-side support means 294. As shown in FIG. 11, shaft mounting members 356 are secured by set-screws 358 to the upper surface at the front end and rear end of the pair of support members 222 in the support base member 216. The shaft mounting members 356 have a box-like portion with its inside in the direction of width being open. A shaft member 360 having pressing rollers 80 fastened thereto at set distances in the axial direction and a shaft member 362 having pressing rollers 82 fastened thereto at set distances in the axial direction have both their ends rotatably inserted in the bearing members 364, which are accommodated in the box-like portions of the shaft mounting members 356 and which can move up and down. The bearing member 364 has an engaging protrusion 366 that protrudes upwardly, and a compression spring 368 that constitutes resiliently urging means is fitted to the engaging protrusion. The compression spring 368 is interposed between the bearing member 364 and the upper wall of the box-like portion of the shaft mounting member 356 and resiliently urges the shaft members 360 and 362 downwardly, i.e., urges the pressing rollers 80 and 82 downwardly. Openings 370 and 372 are formed in the band plate portion 238 of the pair of support plates 222 to correspond to the pressing rollers 80 and 82 which are, therefore, allowed to protrude downwardly through these openings 370 and 372. As clearly shown in FIG. 3, the pressing rollers 80 and 82 act on the lower running portion of the endless belt 88 to press it onto the transparent plate 8 of the electrostatic copying machine 2.

Between the pair of support plates 222, a rearwardly protruded support piece 374 is formed on the driven-side support member 296 of the front-side support means 292, and a forwardly protruded support piece 376 is formed on the driven-side support member 302 of the rear-side support means 294 to correspond thereto. A pair of shaft mounting members 378 are secured by set-screws 379 to each of these support pieces 374 and 376 maintaining a distance in the conveying direction. The shaft mounting members 378 may be constructed in the same manner as the aforementioned shaft mounting members 356 and have a box-like portion with its inside in the direction of width (right-and-left direction in FIG. 12) being open. The shaft member 380 having pressing rollers 84 fixed thereto at set distances in the axial direction and the shaft member 382 having pressing rollers 86 fixed thereto at set distances in the axial direction have their ends are rotatably inserted in the bearing members 384 which are accomodated in the box-like portions of the shaft mounting members 378 and can move up and down. The shaft member 380 and pressing rollers 84 fixed thereto as well as the shaft member 382 and pressing rollers 86 fixed thereto, are downwardly urged by their own weight and act on the lower running portion of the endless belt 88 to press it onto the transparent plate 8 of the electrostatic copying machine 2. As will be clearly understood with reference to FIG. 3, the pressing rollers 84 and 86 positioned at the central portion of the conveyer belt mechanism in the conveying direction have a diameter larger by more than a predetermined amount than the diameter of the driven roller 76 and the follower roller 78 and are sufficiently greater than the size in the up-and-down direction of the support plates 222 disposed on both sides of the pressing rollers 84 and 86. In the diagramed embodiment, the uppermost portions of the pressing rollers 84 and 86 pressed onto the transparent plate 8 via the endless belt 88 are substantially equal to, or are slightly higher than, the uppermost portions of the driven roller 76 and the follower roller 78. When the endless belt 88 is driven in the direction indicated by arrow 92 in FIG. 3, the driven roller 76 is rotated in a direction to take up the upper running portion of the endless belt 88. Therefore, the upper running portion of the endless belt 88 is maintained in a stretched condition. When the endless belt 88 is driven in the direction indicated by arrow 90 in FIG. 3, however, the driven roller 76 is rotated in a direction to push the endless belt 88. Therefore, the upper running portion of the endless belt 88 is slackened, and its central portion deflects downwardly to some extent. In the diagramed embodiment, however, the pressing rollers 84 and 86 positioned at the central portion in the conveying direction have a diameter larger by more than a predetermined amount than the diameter of the driven roller 76 and the follower roller 78 and are sufficiently larger than the size in the up-and-down direction of the support plates 222 that are arranged on both sides of the pressing rollers 84 and 86, as mentioned above. Even when the central portion of the upper running portion of the endless belt 88 is downwardly slackened to a considerable degree in the conveying direction, the endless belt 88 is reliably prevented from coming in contact with the stationary support plates 222 and so is effectively prevented from wearing.

With reference to FIG. 12, a support bracket 386 is secured to the rear surface of the driven-side support member 300 of the rear-side support means 294. The main portion drive source 89, which may be a reversible electric motor, is mounted on the support bracket 386. A toothed pulley 388 is fastened to the output shaft of the main portion drive source 89. A shaft member 390 is rotatably fitted between the driven-side support member 300 and the support bracket 386, and toothed pulleys 392 and 394 are fixed to the shaft member 390. The rear end portion of the shaft member 348 to which the driven roller 76 is fastened protrudes rearwardly, extending through the driven-side support member 300 and has a toothed pulley 396 fixed thereto. A toothed endless belt 398 is wound round the toothed pulley 388 and the toothed pulley 392, and a toothed endless belt 400 is wound round the toothed pulley 394 and the toothed pulley 396. Thus, the driven roller 76 of the conveyer belt mechanism is coupled to the main portion drive source 89, and the conveyer belt mechanism is driven by the main portion drive means 89.

Attention should be given to the following fact concerning the aforementioned document conveying means (conveyer belt mechanism). As will be described later, a cover member 218 is mounted on the support base member 216 and on the conveyer belt mechanism that is mounted thereon; i.e., the conveyer belt mechanism is covered with the cover member 218. The endless belt 88 in the conveyer belt mechanism will be fouled or damaged after it has been used for extended period of time. In such a case, the endless belt 88 must be replaced, and the following operation may be carried out to replace the endless belt 88. First, the cover member 218 is removed. Then, the belt locking member 355 is removed from one end portion of the driven-side support member 296 of the front-side support means 292. Thereafter, the follower-side support member 298 in the front-side support means 292 is operated as mentioned above, and the driven-side support member 296 and the follower-side support member 298 in the front-side support means 292 are locked in the full-length contracted condition as shown in FIG. 13-B. At the same time or thereafter, the follower-side support member 302 in the rear-side support means 294 is operated as described above, and the driven-side support member 300 and the follower-side support member 302 in the rear-side support means 294 are locked in the full-length contracted condition as shown in FIG. 14-B. As a result, the driven roller 76 and the follower roller 78 are brought close to each other, and the endless belt 88 is shifted to be placed in a slackened condition from the stretched condition. It is therefore possible to very easily pull out the endless belt 88 forward to remove it. The driven-side support member 296 and the follower-side support member 298 of the front-side support means 292 have a size in the up-and-down direction which is so small as to not prevent the endless belt 88 from being pulled out forward. Then, a new endless belt 88 is moved from the front toward the rear, and is wound round the driven roller 76, follower roller 78, and pressing rollers 80, 82, 84 and 86 to load it. At this time, the driven roller 76 and the follower roller 78 are maintained in the condition where they are brought close to each other, and it is possible to very easily install the new endless belt 88 as required. Then, through the aforementioned operation for the rear-side support means 294, locking in the full-length contracted condition is released, and the driven-side support member 300 and the follower-side support member 302 in the rear-side support means 294 are placed in the condition (shown in FIG. 14-A) where they are resiliently urged toward the full length thereof due to the action of the resiliently urging means 342. Also in the front-side support means 292, locking in the full-length contracted condition is released due to the above-mentioned operation, and the driven-side support member 296 and the follower-side support member 298 in the front-side support means 292 are placed in the condition (shown in FIG. 13-A) where they are resiliently urged toward the full length thereof due to the action of the resiliently urging means 322. Then, the newly mounted endless belt 88 is stretched by the resiliently urging action of the resiliently urging means 322 and 342. Thereafter, the belt locking member 355 is mounted again on one end of the driven-side support member 296 in the front-side support member 292. Then, the cover member 218 is mounted as required. The above-mentioned operation for replacing the endless belt 88 can be very easily carried out by one person.

With reference to FIGS. 10, 11 and 15, the movable main portion frame member 70 of the central main portion 14 includes, as described already the cover member 218 that covers the document conveying means (conveyer belt mechanism) 74. As mentioned above, protruded pieces 229 are formed at the rear end of one side wall 226 of the pair of coupling members 220 in the support base member 216 of the movable main portion frame member 70, and a threaded hole 231 is formed in the protruded pieces 229. A pair of slots or holes (not shown) are formed in the rear wall of the cover member 218 to correspond to the threaded holes 231. Set-screws (not shown) are screwed into the threaded holes 231 of the protruded pieces 229 through the slots or holes formed in the rear wall of the cover member 218, and the rear wall of the cover member 218 is secured to the coupling members 220 of the support base member 216. As shown in FIGS. 10 and 11, furthermore, the driven-side support member 296 of the front-side support means 292 in the document conveying means 74 has support protrusions 402 and 404 that protrude forward from the upper edge of the support member 296. A hole 406 is formed in one end portion (right upper end in FIG. 10) of the support protrusion 402, and a hole 408 is formed in the support protrusion 404. Further, a pair of coupling blocks (not shown) are fastened to the inner surface of the upper wall of cover member 218 to correspond to the holes 406 and 408, and a threaded hole is formed in each of the coupling blocks. Set-screws (not shown) are screwed into the threaded holes in the coupling blocks through the holes 406 and 408, and the front portion of upper wall of the cover member 218 is fastened to the driven-side support member 296 and is, hence, fastened to the support base member 216 via the driven-side support member 296.

With reference to FIGS. 1 and 15, the cover member 218 has a high bulging portion 410 located at the rear end portion thereof and a low box-like portion 412 that extends forward from the bulging portion 410. The high bulging portion 410 is relatively high, and the low box-like portion 412 is relatively low. The upper surface of the low box-like portion 412 that covers the document conveying means (conveyer belt mechanism) 74 constitutes the document receiving tray 94. An upright wall 414 is formed at one edge (right upper side edge in FIG. 15) of the low box-like portion 412. As will be understood with reference to FIG. 1, the upright wall 414 upwardly extends to slightly under the first discharge opening 114 in the document delivery and re-introduction portion 16. Recessed portions 416, 418 and 420 are formed in the rear portion, the other edge portion (left lower side edge in FIG. 10) and the front portion on the upper surface of the low box-like portion 412. In other words, the upper surface of the low box-like portion 412 is bulged in the areas other than recessed portions 416, 418 and 420, and the amount of the bulging gradually increases in the direction indicated by arrow 422.

As described above, a document placed on the document table 20 of the document introduction portion 12 is positioned with one edge in contact with or very close to the upright stationary document restricting wall 22 irrespective of the document size in the direction of width. The document is conveyed through the central main portion 14 and the document delivery and re-introduction portion 16 while maintaining its position in the direction of width, and is discharged onto the document receiving tray 94 in a direction indicated by arrow 422 through the first discharge opening 114 of the document delivery and re-introduction portion 16. The rear edge of the document receiving tray 94, i.e., the rear edge of the low box-like portion 412 is substantially even with the restricting surface of the upright stationary document restricting wall 22 and forms a reference position in the direction of width of the document. As clearly shown in FIGS. 1 and 15, the recessed portion 416 formed in the rear portion of the document receiving tray 94 has a triangular shape as viewed from the upper direction and has a width that gradually increases in the document delivering direction indicated by arrow 422 from a reference position of the document in the direction of width (i.e., rear edge of the document receiving tray 94) toward nearly the center of the document receiving tray 94 in the direction width. The document receiving tray 94 has a protuberance 424 that extends in front and close to, the front edge of the triangular recessed portion 416. The protuberance 424 extends forwardly toward the downstream side in the document delivering direction indicated by arrow 422, i.e., extends at an angle from the side of the reference position of the document in the direction of width toward the central side in the direction of width. A document stop piece 426 is mounted on the protuberance 424 to move therealong, and the protuberance 424 constitutes guide means for the document stop piece 426 which has a base portion 428 and an upright portion 430. In the base portion of the document stop piece 426 is formed an engaging groove 431 that works in cooperation with the protuberance 424. With the engaging groove 431 engaged with the protrusion 424, the document stop piece 426 is mounted to move along the protuberance 424. The engaging groove, too, is angled in the same direction as the protuberance 424, and the document stop piece 426 is allowed to move along the protuberance 424 with its upright portion 430 always maintaining a perpendicular relationship with respect to the document conveying direction indicated by arrow 422.

In the aforementioned document receiving tray 94, the document stop piece 426 is manually moved to a desired position depending upon the size of the document discharged from the first discharge opening 114 of the document delivery and re-introduction portion 16. The document stop piece 426 is so positioned that the distance between the upright portion 430 of the document stop piece 426 and the first discharge opening 114 is nearly the same as the length size in the conveying direction of the document discharged from the first discharge opening 114. The document discharged from the first discharge opening 114 comes into contact at its leading edge with the upright portion 430 of the document stop piece 426, ceases to move, and is collected as desired on the document receiving tray 94. Usually, the document has a size in the conveying direction that corresponds to the size in the direction of width of the document. That is, usually a document having a relatively large size in the conveying direction has a size that is relatively large in the direction of width thereof, while a document having a relatively small size in the conveying direction has a size that is relatively small in the direction of width thereof. In the document receiving tray 94 constituted according to the present invention, the document stop piece 426 may be moved in the direction indicated by arrow 422 to accommodate a larger size document in the conveying direction. That is, the document stop piece 426 moves in the direction indicated by arrow 422 away from the first discharge opening 114 and further moves forward in the direction of the width document. Contrarily, the document stop piece 426 may be moved in the direction opposite to the direction indicated by arrow 422 to accommodate a smaller size document document in the conveying direction. That is, the document stop piece 426 is brought closer to the first discharge opening 114 and further is moved rearwardly in the direction of width. Therefore, the document that is discharged with its trailing edge located at the reference position in the direction of width, i.e., with its trailing edge in contact with or close to the rear edge of the document receiving tray 94, has its leading edge in contact at the document central portion in the direction of width with the upright portion 430 of the document stop piece 426, irrespective of the size of the document in the direction of a document width. Therefore, the document comes to a halt without being angled and is collected on the document receiving tray 94. If the document stop piece remains stationary in the direction of document width irrespective of the size in the conveying direction or the size in the direction of document width of the document, not the central portion but one side portion of the leading edge of the document comes in contact with the document stop piece. Therefore, the document tends to be angled due to contact, at one side portion thereof. The documents collected on the document receiving tray 94 can be very easily grasped and taken out by a hand that is inserted in the recessed portion 416 formed in the rear portion. The recessed portion 416, too, has a shape such that its width gradually increases in the forward direction at points further from the first discharge opening 114. Therefore, small documents are prevented from falling into the recessed portion 416, and sufficient space is maintained under the document for holding the documents irrespective of the size of the documents.

With reference to FIG. 11, a grip member 434 and a permanent magnet 436 are mounted via a leaf spring 432 on the surface of the driven-side support member of the front-side support means 292 in the movable main portion frame member 70 of the central main portion 14 or, more specifically, in the document conveying means (conveyer belt mechanism) 74 on which the support base member 216 is secured. A pair of threaded holes 438 are formed nearly in the central portion of the driven-side support member 296 a suitable distance apart in the conveying direction. Holes 440 are formed in both end portions of a slender band-like leaf spring 432 that extends in the conveying direction. Set-screws 442 are screwed into the threaded holes 438 of the driven-side support member 296 via holes 440 of the leaf spring 432, whereby both ends of the leaf spring 432 are fastened to the driven-side support member 296. A coupling piece 444 is fastened to the central portion of the leaf spring 432. The coupling piece 444 has an L-shape in cross section and consists of an upper wall portion 446 and a hanging portion that hangs down therefrom. A pair of threaded holes 450 are formed in the hanging portion a distance apart in the conveying direction, and a pair of holes 452 are formed in the central portion of the leaf spring 432 to correspond thereto. Set-screws 454 are screwed into the threaded holes 450 via the holes 452, and the coupling member 444 is secured to the central portion of the leaf spring 432. To the coupling member 444 are secured the aforementioned grip member 434 and the permanent magnet 436. The grip member 434 has an upper wall portion 456 and a hanging portion 458 that hangs down from the center in the direction of width of the upper wall portion 456. The upper wall portion 456 extends forward beyond the hanging portion and then extends upwards. The lower surface of the front half of the upper wall portion 456 of the grip member 434 defines a finger-touch surface that can be touched by finger of the operator. The permanent magnet 436 has a parallelopiped shape, and on the upper surface thereof is secured a coupling plate 460 by suitable means such as an adhesive. The coupling plate 460 extends in the conveying direction beyond the permanent magnet 436 and has holes 462 formed in both end portions. A pair of holes 464 are formed in the rear half portion of the upper wall portion 456 of the grip member 434 to correspond to these holes 462, and a pair of threaded holes 466 are formed in the upper wall portion 446 of the coupling member 444. Set-screws 468 are screwed into the threaded holes 466 of the coupling member 444 via holes 462 of the coupling plate 460 and holes 464 of the grip member 434, whereby the grip member 434 and the permanent magnets 436 are secured to the coupling member 444 (i.e., to the central portion of the leaf spring 432). As will be understood with reference to FIGS. 11, 1 and 2, a downwardly faced rectangular opening 470 is formed in the central portion of the front wall of the cover member 218 in the central main portion 14, and the front half of the upper wall portion 456 of the grip member 434 is exposed to view through the opening 470. The flat attractive lower surface of the permanent magnet 436 is exposed downwardly. As clearly shown in FIG. 2, a plate-like magnetic member 472 having a flat upper surface is secured to the front portion of the transparent plate 8 on the upper surface of the housing 6 of the electrostatic copying machine 2.

When the movable main portion frame member 70 of the central main portion 14 is brought to the closed position shown in FIG. 1, the attractive lower surface of the permanent magnet 346 comes in contact with, or is located close to, the upper surface of the magnetic member 472, and the movable main portion frame 70 is held at the closed position owing to the magnetic attractive force of the permanent magnet 346 that acts on the magnetic member 472. To open the movable main portion frame member 70, the finger-touch surface (i.e., lower surface of front half of the upper wall portion 456) of the grip member 434 is touched by the fingers and is pushed upwards. Therefore, the permanent magnet 436 is, first, tilted due to the resilient deformation of the leaf spring 432 and, more specifically, the leaf spring 432 is resiliently displaced forward at its central lower portion and the permanent magnet 436 is so tilted that its lower front portion moves upwards with its lower rear edge as a center. Thus, the magnetic attractive force of the permanent magnet 436 is considerably decreased with respect to the magnetic member 472. Then, as the finger-touch surface of the grip member 434 is further pushed up, the permanent magnet 436 is separated from the magnetic member 472, and the movable main portion frame member 70 is allowed to move from its closed position. The permanent magnet 436 escapes from the magnetic member 472 in two steps; i.e., a first step in which the magnetic attractive force decreases due to the inclination of the permanent magnet 436 and a subsequent second step in which the permanent magnet 436 is separated from the magnetic member 472. Therefore, even though the permanent magnet 436 has a magnetically attractive force which is great enough to reliably maintain the movable main portion frame member 70 at the closed position, the permanent magnet 436 can be very easily separated from the magnetic member 472 even with a relatively small force. Attention should be given to the fact that a mechanism for tiltably mounting the permanent magnet 436 is simply and cheaply constructed by using the leaf spring 432.

A preferred embodiment of the automatic document conveying device constituted according to the present invention was described above in detail with reference to the accompanying drawings. It should, however, be noted that the present invention is in no way limited to the above embodiment only but can be modified or changed in a variety of other ways without departing from the scope of the present invention.

What we claim is:

1. An automatic document conveying device for an image processor having a housing with a transparent plate on the upper surface thereof for placement thereon of a document to be processed, said document conveying device comprising:

a main portion including a movable main portion frame member mounted for pivoting between a closed position covering the transparent plate and an open position in which the transparent plate is exposed to view, and document conveying means mounted on said main portion frame member, for conveying a document along the transparent plate when said main portion frame member is in the closed position, said document conveying means comprising a conveyer belt mechanism having front-side support means and rear-side support means disposed a first preset distance apart in the width direction of a document being conveyed, a driven roller and a follower roller extending between said front-side support means and said rear-side support means a second preset distance apart in the conveying direction of a document, and an endless belt wound round said driven roller and said follower roller;

said front-side support means comprising a front driven-side support member and a front follower-side support member, said front driven-side support member and said front follower-side support member being coupled together while permitting relative movement of said front driven-side support member and said front follower-side support member in the conveying direction to change the full length of said front-side support means, resilient urging means for resiliently urging said front driven-side support member and said front follower-side support member to an extended position in which the full length of said front-side support means is increased, and locking means for releasably locking said front driven-side support member and said front follower-side support member in a shortened position in which the full length of said front-side support means is shortened against the resiliently urging action of said resilient urging means;

the front end of said driven roller being mounted on said front driven-side support member, the front end of said follower roller being mounted on said front follower-side support member, said endless belt being in a stretched condition when said front-side support means is in its extended position, and said endless belt being in a slackened condition when said front-side support means is in its shortened position.

2. The automatic document conveying device according to claim 1, wherein said rear-side support means comprises a rear driven-side support member and a rear follower-side support member, said rear driven-side support member and said rear follower-side support member being coupled together while permitting relative movement of said rear driven-side support member and said rear follower-side support member in the conveying direction to change the full length of said rear-side support means, resilient urging means for resiliently urging said rear driven-side support member and said rear follower-side support member to an extended position in which the full length of said front-side support means is increased, and locking means for releasably locking said rear driven-side support member and said rear follower-side support member in a shortened position in which the full length of said rear-side support means is shortened against the resiliently urging action of said resilient urging means;

the rear end of said driven roller being mounted on said rear driven-side support member, the rear end of said follower roller being mounted on said rear follower-side support member, said endless belt being in a stretched condition when said rear-side support member is in its extended position, and said endless belt being in a slackened condition when said rear-side support means is in its shortened position.

3. The automatic document conveying device according to claim 1, wherein one of said front driven-side support member and said front follower-side support member has a slot therein, said slot having a relative movement-permitting portion extending in the conveying direction and a lock portion extending substantially perpendicular to the conveying direction, said front-side support means further comprising a pin disposed on the other one of said front driven-side support member and said front follower-side support member for insertion in said slot, said pin being movable in said relative movement-permitting portion as said front driven-side support member and said front follower-side support member move relative to each other in the conveying direction, and when said pin is in said lock portion, said front driven-side support member and said front follower-side support member are in the shortened position with relative movement of said front driven-side support member and said front follower-side support member in the conveying direction being prevented.

4. The automatic document conveying device according to claim 1, wherein said main portion frame member comprises a movably mounted support base member, having said conveyer belt mechanism mounted thereon, and cover member removably mounted on said support base member to cover said conveyer belt mechanism and removable therefrom to expose said conveyer belt mechanism to view, enabling said endless belt to be easily replaced.

5. The automatic document conveying device according to 4, wherein said front driven-side support member is mounted on said support base member, and said front follower-side support member in mounted on said front driven side support member.

6. The automatic document conveying device according to 1, wherein said conveyer belt mechanism further includes a belt locking member detachably mounted on said front driven-side support member for preventing said conveyer belt mechanism from moving forward, while permitting said endless belt to be pulled forward from said driven roller and said follower roller when said belt locking member is detached from said front driven-side support member and said front side support means is in the shortened position.

7. An automatic document conveying device for an image processor having a housing with a transparent plate on the upper surface thereof for placement thereon of a document to be processed, said document conveying device comprising:

a main portion including a movable main portion frame member mounted for movement between a closed position covering the transparent plate and an open position in which the transparent plate is exposed to view;

a holding portion including a grip member, a permanent magnet, a leaf spring mounting said grip member and said permanent magnet on said main portion frame member, and a magnetic member mounted on the upper surface of the housing so that when said main portion frame member is in the closed position, said permanent magnet magnetically attracts said magnet member to magnetically hold said main portion frame member in the closed position, and when said grip member is grasped by a finger and lifted with said main portion frame member in the closed position, said permanent magnet is tilted by resilient deformation of said leaf spring, and the magnetic force of said permanent magnet is decreased with respect to said magnet member.

8. The automatic document conveying device according to claim 7, wherein said magnetic member has a flat upper attraction surface, and said permanent magnet has a flat attractive lower surface to attract said upper attraction surface, so that when said permanent magnet is tilted, said attractive lower surface is tilted with respect to said upper attraction surface.

9. The automatic document conveying device according to claim 7, wherein said leaf spring has the shape of a slender band plate, both ends of said leaf spring being fastened to said main portion frame member, and said grip member and said permanent magnet are fastened to the central portion of said leaf spring.

10. The automatic document conveying device according to claim 7, wherein said grip member is disposed on the front surface of said main portion frame member and includes a downwardly facing finger-touch surface, and when said finger-touch surface is pushed up by a finger, said permanent magnet is tilted to move the front edge thereof upwards.

11. An automatic document conveying device for an image processor having a housing with a transparent plate on the upper surface thereof for placement thereon of a document to be processed said document conveying device comprising:

a main portion including a movable main portion frame member mounted for movement between a closed position covering the transparent plate and an open position in which the transparent plate is exposed to view, and document conveying means mounted on said main portion frame member for conveying a document along the transparent plate when said main portion frame member is in the closed position;

said main portion frame member including a support base member and a cover member, said document conveying means being mounted on said support base member and covered by said cover member; and said support base member including a support plate extending forwardly from the cantilevered rear end thereof, and said support plate being so shaped that a front portion thereof has a geometrical moment of inertia which is smaller than that of a rear portion thereof in order to reduce the weight thereof.

12. The automatic document conveying device according to claim 11, wherein said support base member includes two support plates disposed a preset distance apart in the document conveying direction.

13. The automatic document conveying device according to claim 11, wherein said support plate has a plurality of openings formed in the longitudinal direction thereof at preset distances in order to reduce the weight of said support plate, the openings located in the front portion of said support plate having areas larger than the openings located in the rear portion.

14. The automatic document conveying device according to claim 11, wherein said support plate has a plurality of openings formed in the longitudinal direction thereof at preset distances in order to reduce the weight of said support plate, the density of the openings in the front portion of said support plate being greater than the density of the openings in the rear portion of said support plate.

15. The automatic document conveying device according to claim 11, wherein said support plate has a band plate portion and side wall portions that protrude upwardly or downwardly from at least the side edges of said band plate portion, the height of protrusion in the front portions of said side wall portions being smaller than the height of protrusion in the rear portions of said side wall portions.

16. The automatic document conveying device according to claim 11, wherein said support plate is made of an extrusion-molded aluminum material.

17. An automatic document conveying device for an image processor having a housing with a transparent plate on the upper surface thereof for placement thereon of a document to be processed, said document conveying device comprising:

a main portion including a movable main portion frame member mounted for pivoting between a closed position covering the transparent plate and an open position in which the transparent plate is exposed to view, document conveying means mounted on said main portion frame member for conveying a document along the transparent plate when said main portion frame member is in the closed position;

a first hinge mechanism mounting said main portion frame member on the upper surface of the housing, said hinge mechanism including a stationary member and a pivoting member pivotably coupled to said stationary member, said main portion frame member being pivotably coupled to said pivoting member to the rear of the center of gravity of said main portion; and resilient urging means between said pivoting member and said main portion frame member to give to said main portion frame member a balancing moment of rotation nearly equal to an angular moment caused by the weight of said main portion that works to pivot said main portion frame member relative to said pivoting member when said main portion frame member is in the closed position.

18. The automatic document conveying device according to claim 17, wherein the magnitude of said balancing moment of rotation is adjustable.

19. The automatic document conveying device according to claim 17, further comprising a second, identical hinge mechanism disposed a distance from said first hinge mechanism in the document conveying direction, and wherein said main portion frame member includes two coupling members pivotably coupled to said two hinge mechanisms.

20. The automatic document conveying device according to claim 17, further comprising a brake mechanism including a stationary brake piece and a pivotable brake piece disposed on said main portion frame member, so that when said main portion frame member is moved to the open position from the closed position, the balancing moment of rotation caused by the urging action of said resilient urging means becomes greater than the moment of rotation caused by the weight of said main portion, and said main portion frame member is slightly pivoted in the direction of the balancing moment of rotation with respect to said pivoting member, such that said pivotable brake piece is pressed onto said stationary brake piece to exert braking action on said main portion frame member.

21. The automatic document conveying device according to claim 20, wherein said stationary brake piece is disposed on said stationary member of said hinge mechanism.

22. The automatic document conveying device according to claim 20, wherein said pivotable brake piece has an arcuate outer peripheral surface, and said stationary brake piece has an arcuate inner peripheral surface, so that when said main portion frame member is slightly pivoted in the direction of the balancing moment of rotation with respect to said pivoting member, said arcuate outer peripheral surface is pressed onto said arcuate inner peripheral surface.

23. The automatic document conveying device according to claim 22, wherein said arcuate inner peripheral surface includes a first arcuate inner peripheral surface portion, a step portion, and a second arcuate inner peripheral surface portion separate from said first arcuate inner peripheral surface portion via said step portion, so that when said main portion frame member is moved to the open position by more than a predetermined angle from the closed position, said arcuate outer peripheral surface of said pivotable brake piece moves from said first arcuate peripheral surface portion, through said step portion, to said second arcuate inner peripheral surface portion, whereby said main portion frame member is further slightly pivoted in the direction of the balancing moment of rotation with respect to said pivoting member, such that said arcuate outer peripheral surface is pressed onto said second arcuate inner peripheral surface portion.

24. An automatic document conveying device for an image processor having a housing with a transparent plate on the upper surface thereof for placement thereon of a document to be processed, said document conveying device comprising:

a main portion including a movable main portion frame member mounted for movement between a closed position covering the transparent plate and an open position in which the transparent plate is exposed to view, and document conveying means mounted on said main portion frame member for conveying a document along the transparent plate when said main portion frame member is in the closed position;

said main portion frame member comprising a support base member and a cover member, said document conveying means comprising a conveyer belt mechanism mounted on said support base member with said cover member covering said conveyer belt mechanism;

said conveyer belt mechanism including a driven roller and a follower roller disposed a first preset distance apart in the document conveying direction, a plurality of pressing rollers disposed between said driven roller and said follower roller a second preset distance apart in the document conveying direction, and an endless belt wound round said driven roller, said follower roller and said plurality of pressing rollers, said plurality of pressing rollers being mounted for movement over a predetermined range in the vertical direction and being urged downwardly to press the lower running portion of said endless belt onto the transparent plate when said main portion frame member is in the closed position; and said support base member of said main portion frame member extending between the upper running portion and the lower running portion of said endless belt, at least one of said plurality of pressing rollers having a diameter greater by more than a predetermined amount than the diameter of said driven roller and said follower roller, in order to prevent the upper running portion of said endless belt from sagging downwardly to come in contact with said support base member.

25. The automatic document conveying device according to claim 24, wherein said conveyer belt mechanism includes a front-side support means and a rear-side support means, said front-side support means and said rear-side support means being mounted on said support base member a preset distance apart in the direction of width, and wherein said driven roller, said follower roller and said pressing rollers are mounted between said front-side support means and said rear-side support means.

* * * * *